(12) United States Patent
Mangum et al.

(10) Patent No.: US 10,232,910 B2
(45) Date of Patent: Mar. 19, 2019

(54) SNOW VEHICLE

(71) Applicant: Polaris Industries Inc., Medina, MN (US)

(72) Inventors: Allen M. Mangum, Sandpoint, ID (US); Justin R. York, Cocolalla, ID (US)

(73) Assignee: Polaris Industries Inc., Medina, MN (US)

( * ) Notice: Subject to any disclaimer, the term of this patent is extended or adjusted under 35 U.S.C. 154(b) by 54 days.

(21) Appl. No.: 15/165,862

(22) Filed: May 26, 2016

(65) Prior Publication Data

US 2017/0129570 A1 May 11, 2017

Related U.S. Application Data

(63) Continuation-in-part of application No. 14/935,224, filed on Nov. 6, 2015, now Pat. No. 9,873,485, which is a continuation-in-part of application No. 14/935,265, filed on Nov. 6, 2015, now Pat. No. 9,751,552.

(51) Int. Cl.
*B62B 13/18* (2006.01)
*B62M 27/02* (2006.01)
*B62K 13/00* (2006.01)

(52) U.S. Cl.
CPC ............. *B62M 27/02* (2013.01); *B62K 13/00* (2013.01); *B62M 2027/021* (2013.01); *B62M 2027/026* (2013.01); *B62M 2027/028* (2013.01)

(58) Field of Classification Search
CPC ............ B62M 2027/021; B62B 13/046; B62B 13/043; B62B 17/04
See application file for complete search history.

(56) References Cited

U.S. PATENT DOCUMENTS

| 3,705,749 A | 12/1972 | Harvey |
| 3,809,172 A | 5/1974 | Hendrickson |
| RE28,423 E | 5/1975 | Higginbotham |
| (Continued) | | |

FOREIGN PATENT DOCUMENTS

| DE | 202006017459 | 6/2007 |
| EP | 0391282 | 10/1990 |
| (Continued) | | |

OTHER PUBLICATIONS

International Search Report and Written Opinion of the International Searching Authority, dated Apr. 18, 2017, for related International Patent Application No. PCT/US2016/060441; 27 pages.

(Continued)

*Primary Examiner* — Tony H Winner
(74) *Attorney, Agent, or Firm* — Faegre Baker Daniels LLP

(57) ABSTRACT

A snow vehicle is disclosed comprising a vehicle frame, a propulsion unit coupled to the frame, and at least one front ski steered by a steering mechanism. The front of the vehicle includes a first front suspension and a second front suspension coupled to the ski. The rear suspension includes a bumper assembly preventing bottoming out of the rear suspension. The rear suspension is coupled to the vehicle frame such that the longitudinal spacing between the vehicle frame and rear suspension is adjustably controllable.

42 Claims, 23 Drawing Sheets

(56) References Cited

U.S. PATENT DOCUMENTS

| | | |
|---|---|---|
| 3,977,485 A | 8/1976 | West |
| 3,982,597 A | 9/1976 | Callaway |
| 4,034,820 A | 7/1977 | Barnhardt |
| 4,131,292 A | 12/1978 | Swech |
| 4,244,436 A * | 1/1981 | Condon ................ B62M 27/02 180/191 |
| 4,424,979 A | 1/1984 | Takagi |
| 4,509,766 A | 4/1985 | Yasui |
| 4,613,006 A | 9/1986 | Moss |
| 4,804,198 A | 2/1989 | Imai |
| 5,203,424 A | 4/1993 | Gogo |
| 5,474,146 A | 12/1995 | Yoshioka |
| 5,727,643 A | 3/1998 | Kawano |
| 6,095,275 A | 8/2000 | Shaw |
| 6,431,301 B1 | 8/2002 | Forbes |
| 7,182,165 B1 | 2/2007 | Keinath |
| 8,910,738 B2 | 12/2014 | Mangum |
| 2003/0159868 A1 | 8/2003 | Alexander |
| 2004/0089193 A1 | 5/2004 | O'Donnell |
| 2008/0029324 A1 | 2/2008 | Plankenhom |
| 2009/0321167 A1 | 12/2009 | Simmons |
| 2015/0144412 A1 | 5/2015 | Mangum |
| 2015/0251727 A1 | 9/2015 | Thibault |
| 2015/0259032 A1 | 9/2015 | Mangum |
| 2016/0031471 A1 | 2/2016 | Anderson et al. |
| 2016/0167722 A1 | 6/2016 | Anderson et al. |

FOREIGN PATENT DOCUMENTS

| | | |
|---|---|---|
| JP | S61222877 | 10/1986 |
| JP | 2001153168 | 6/2001 |

OTHER PUBLICATIONS

Technical Preview, SnowTech, *Crazy Mountain Xtreme Bike Kit*, Sep. 2015; 3 pages.

* cited by examiner

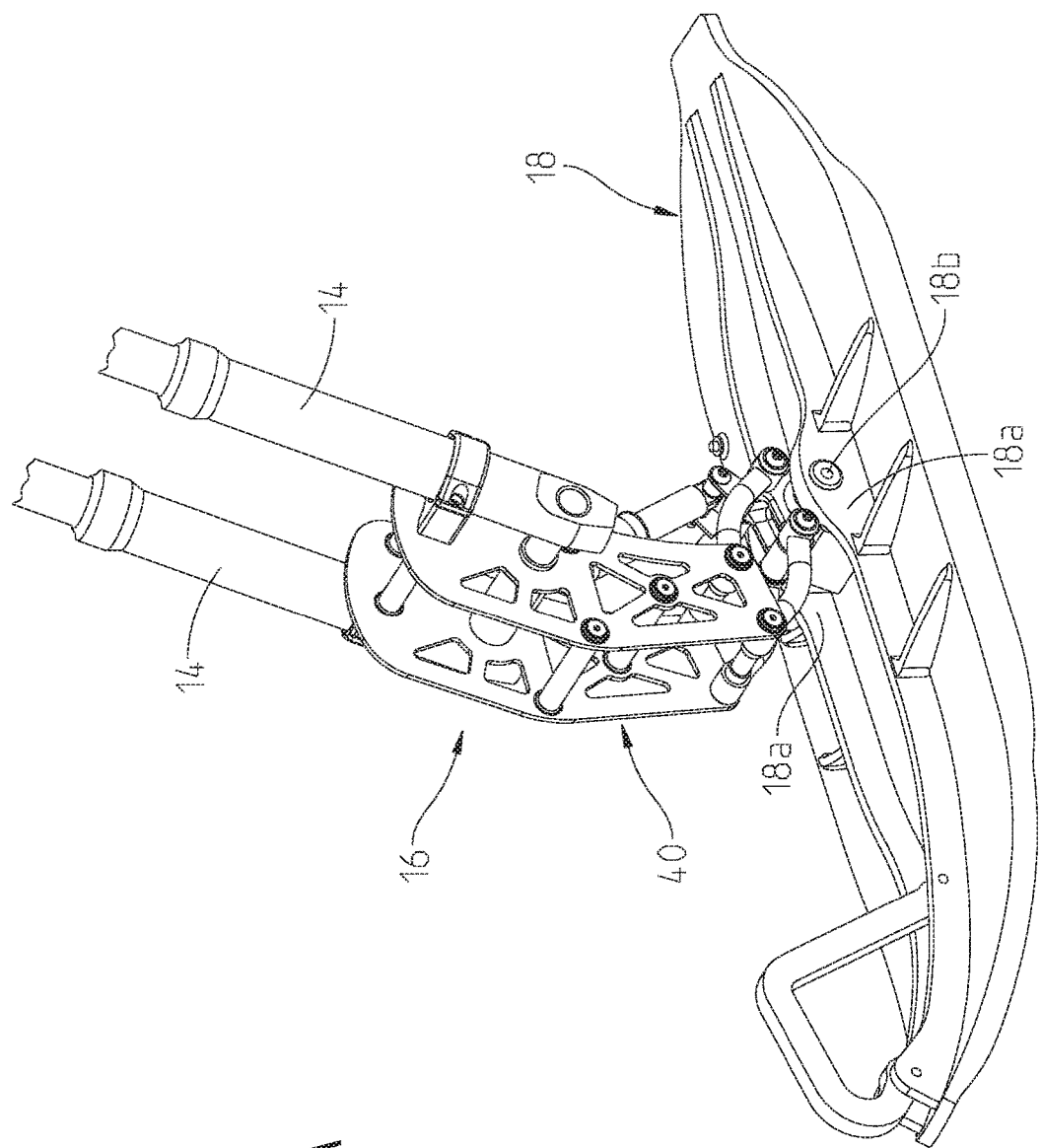

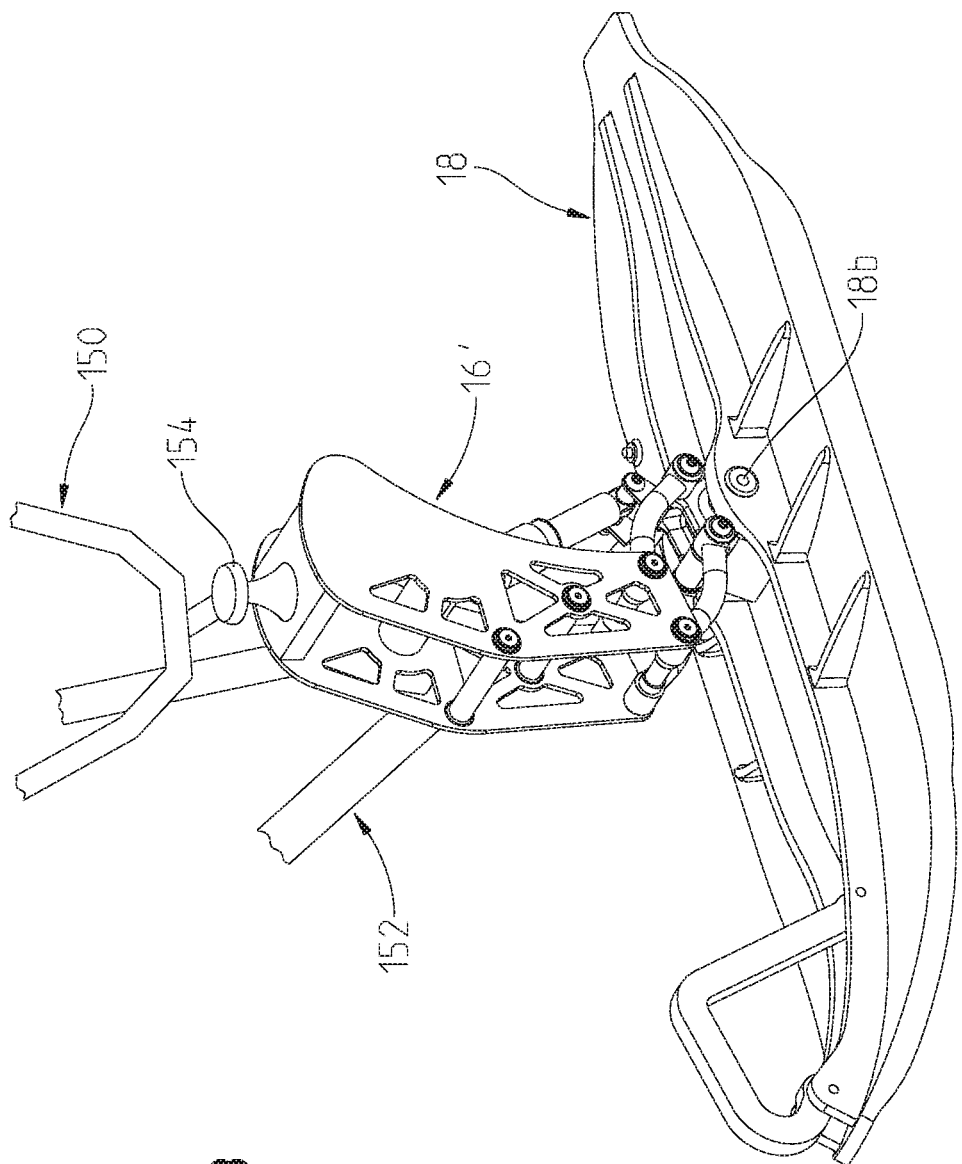

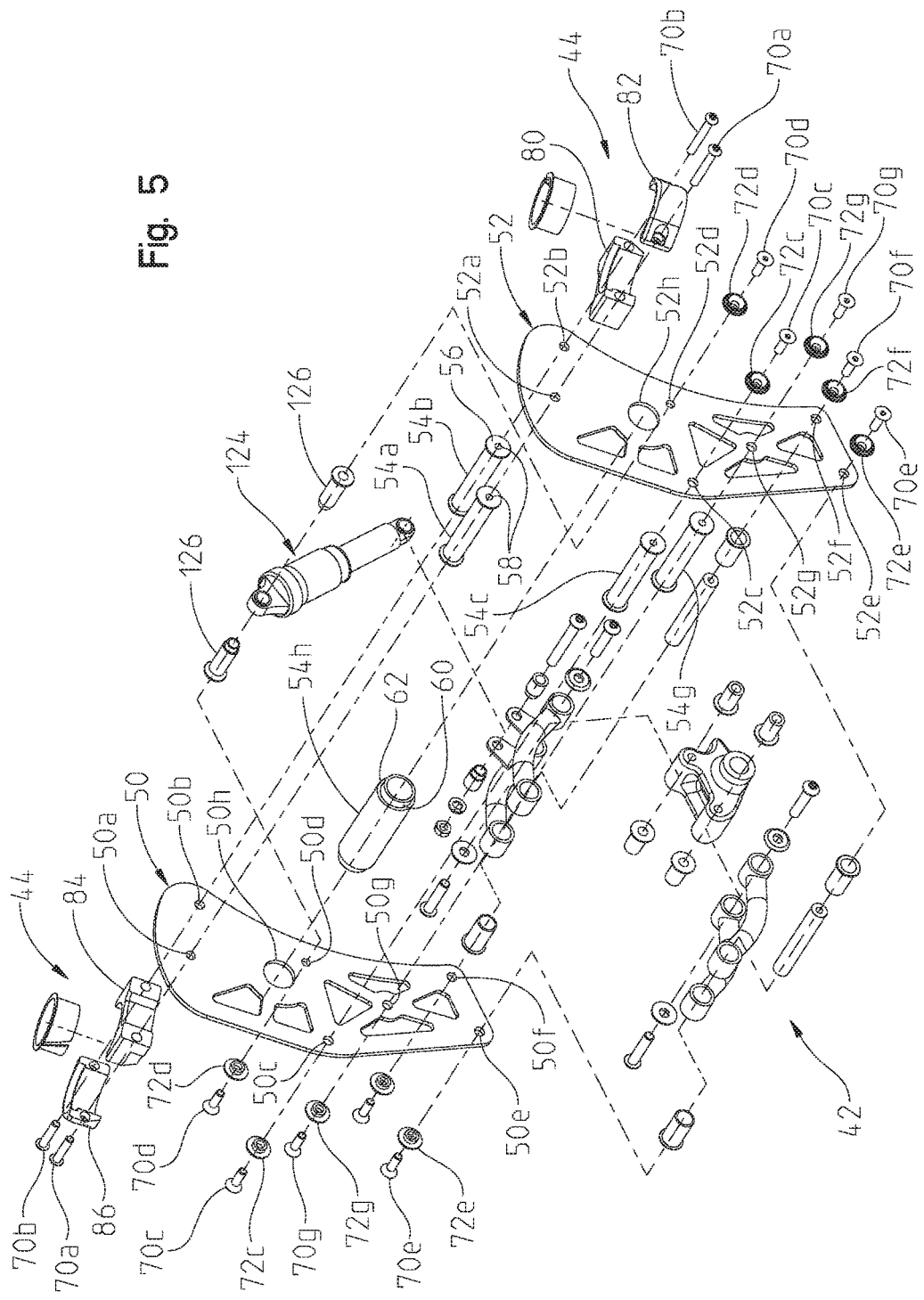

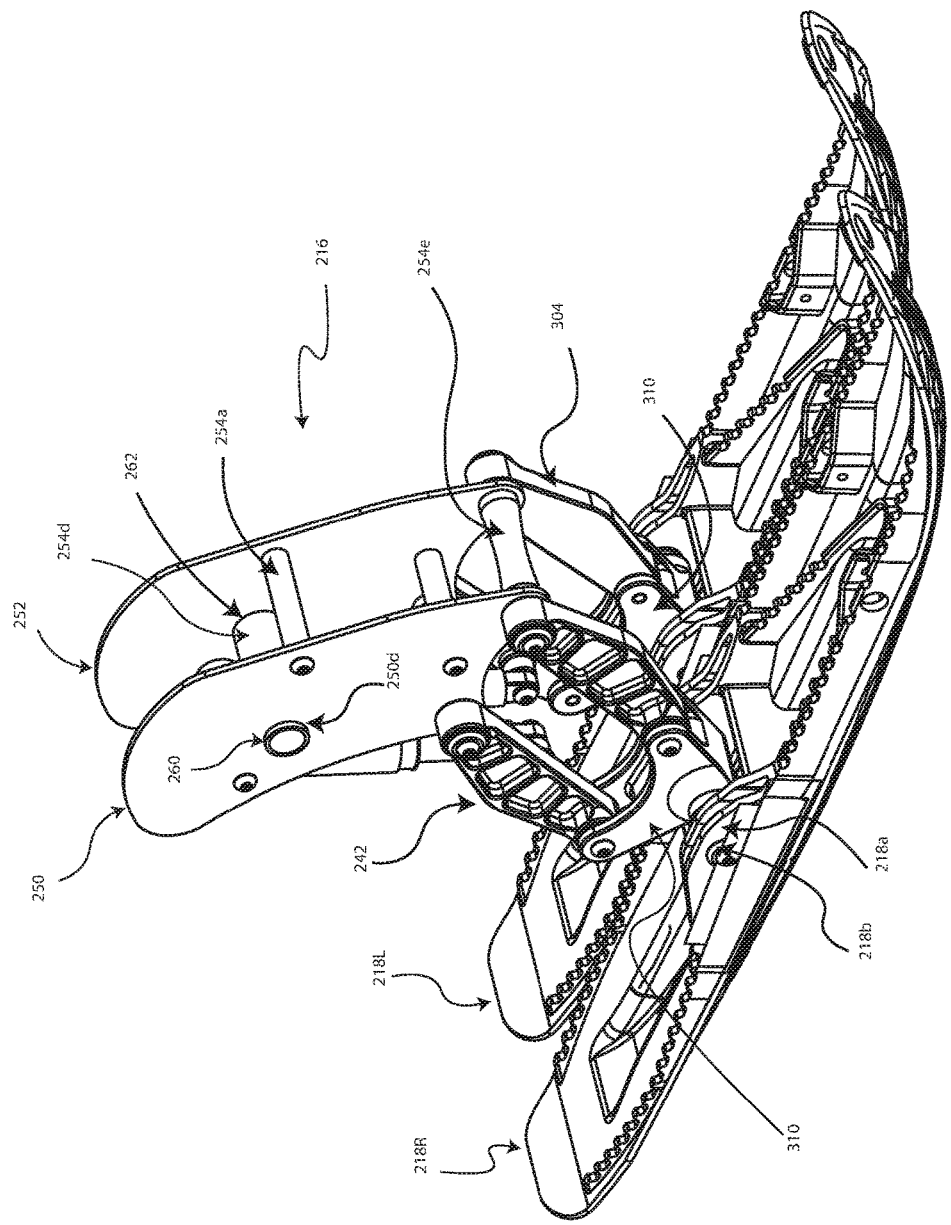

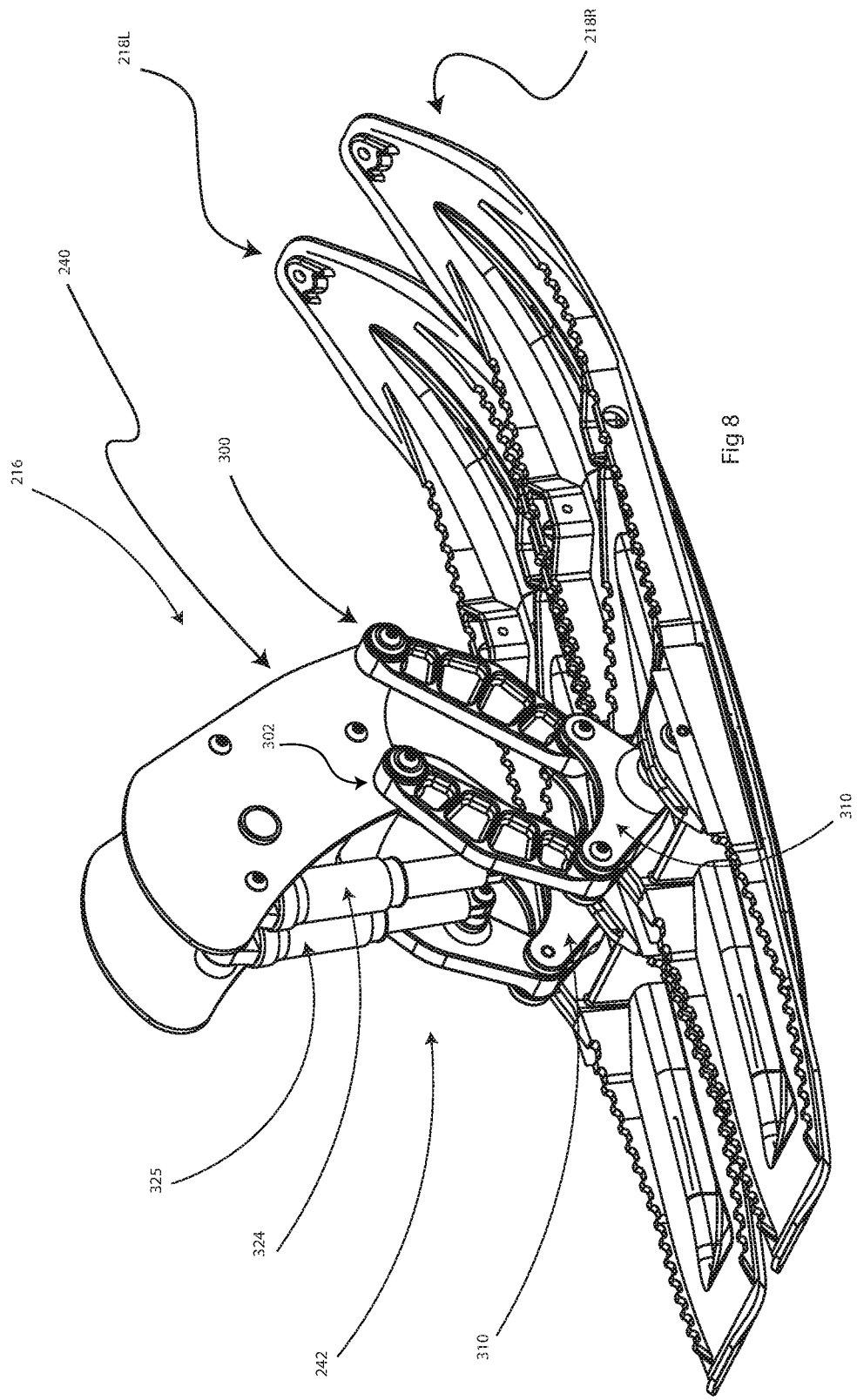

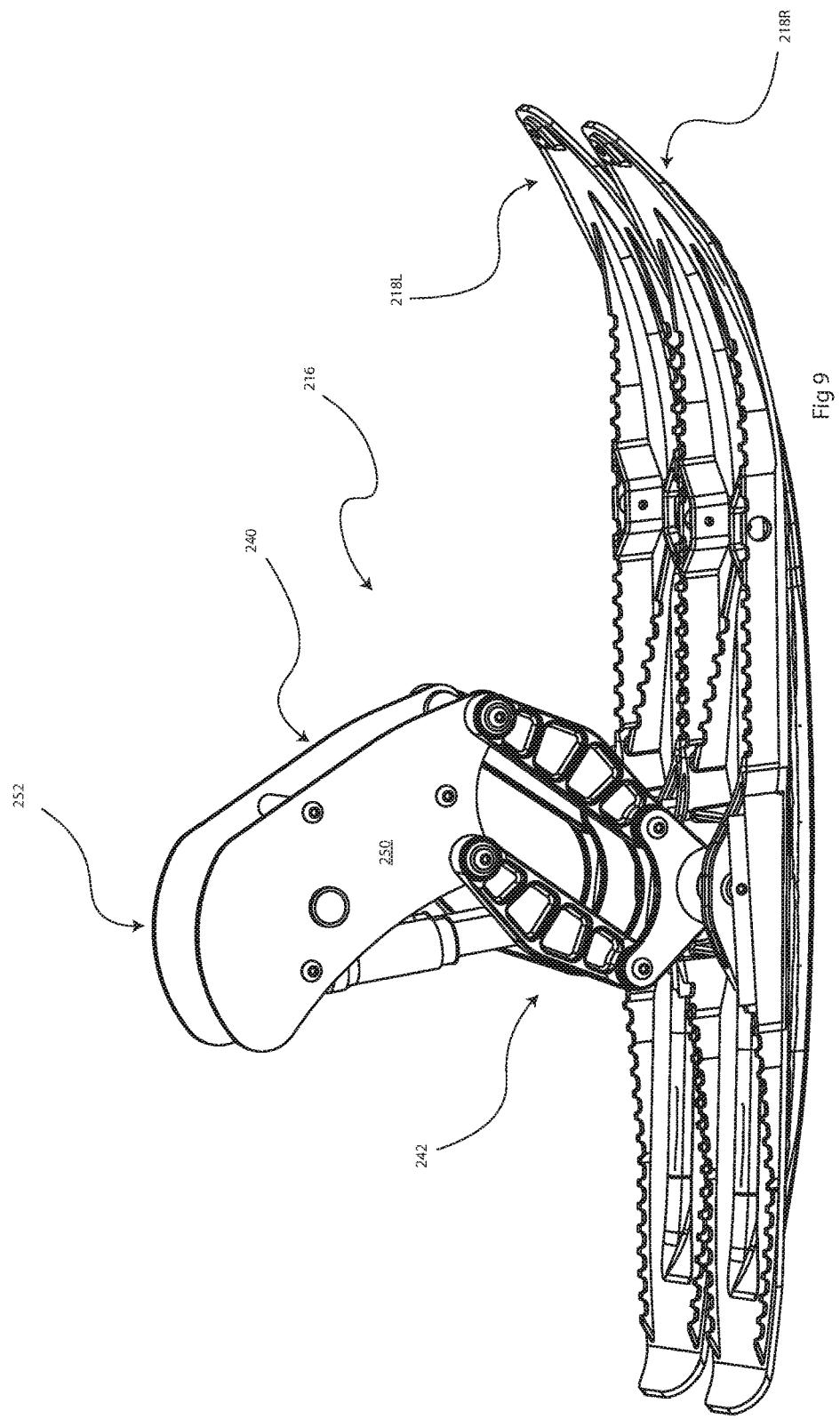

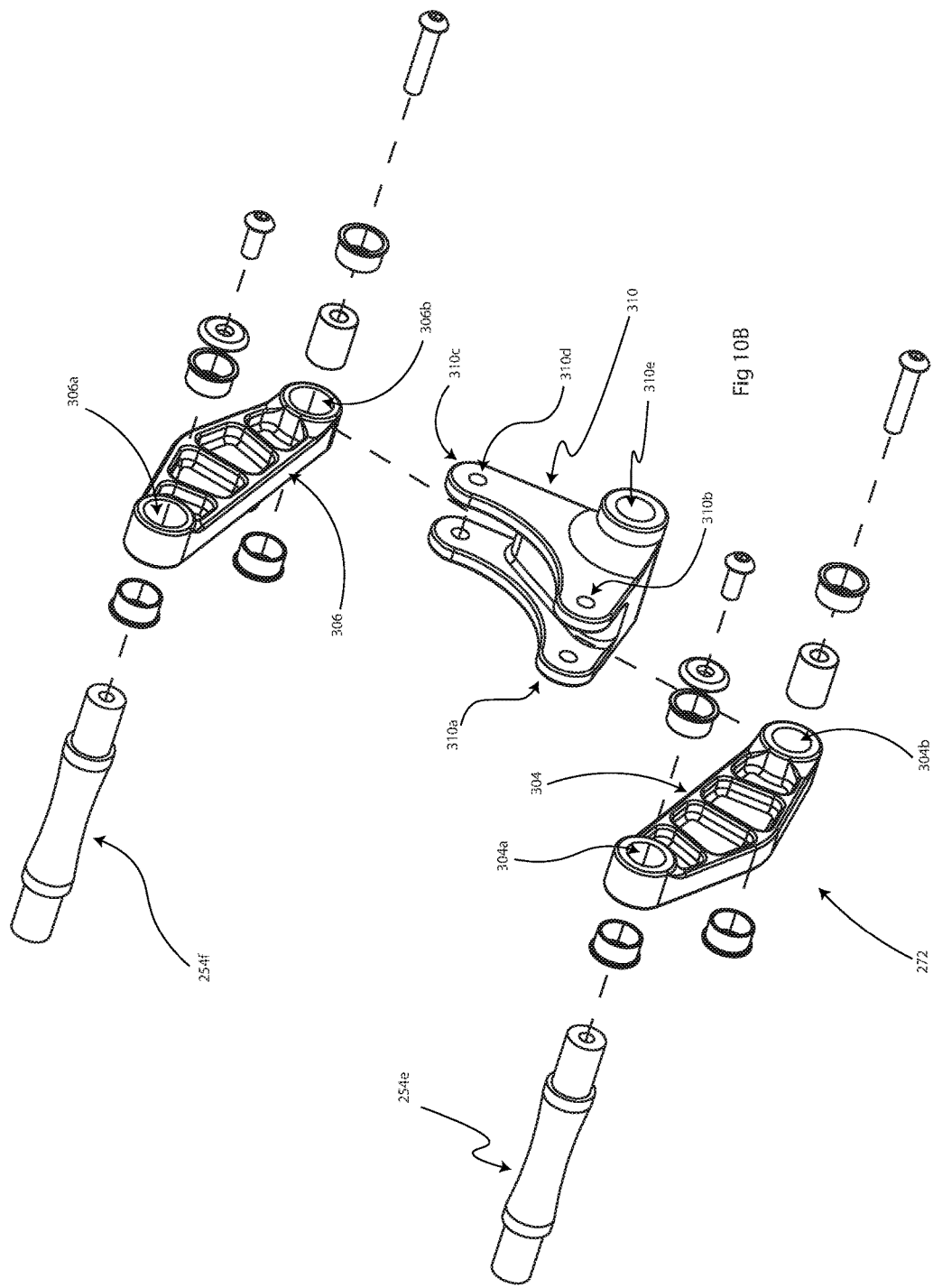

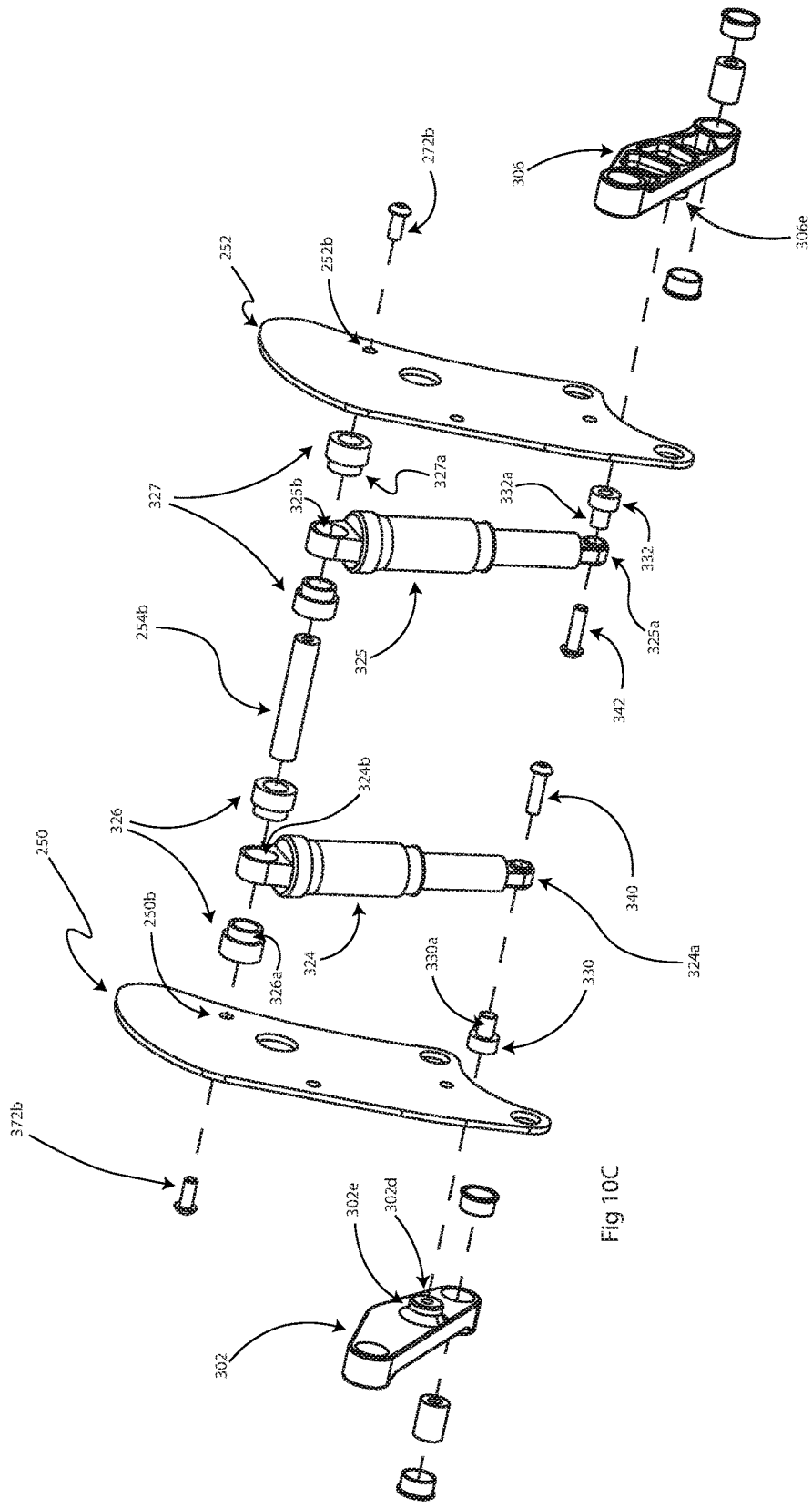

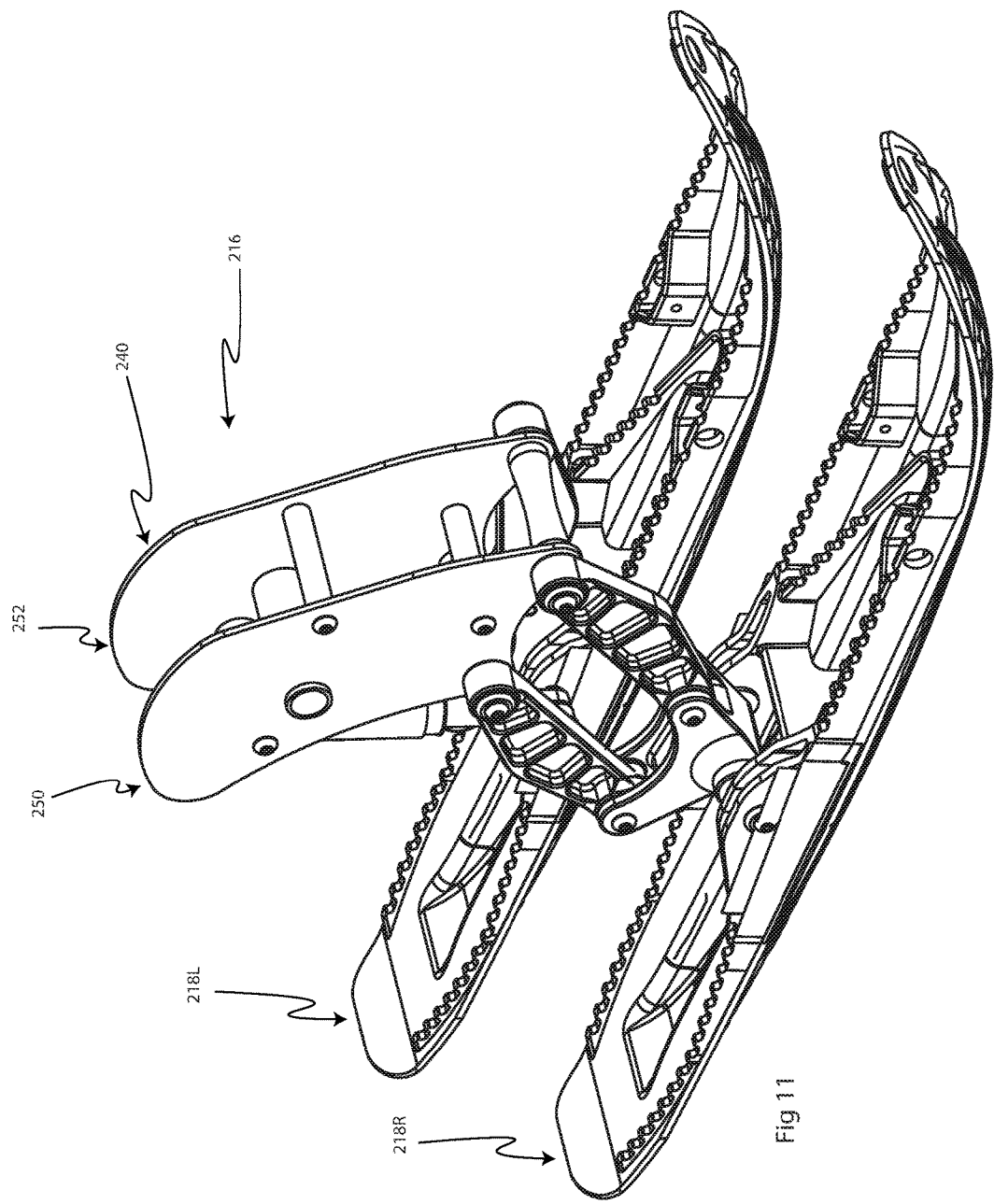

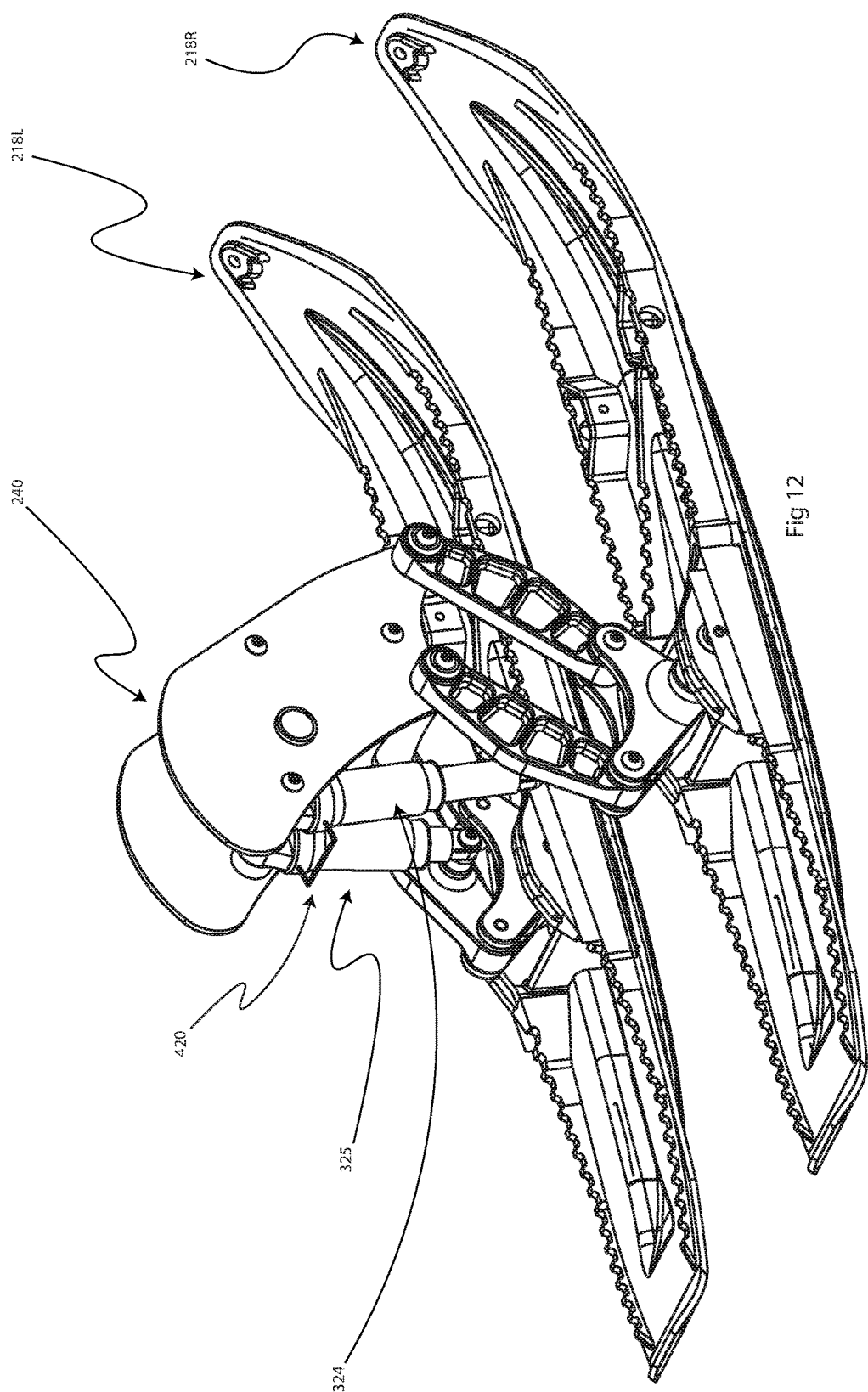

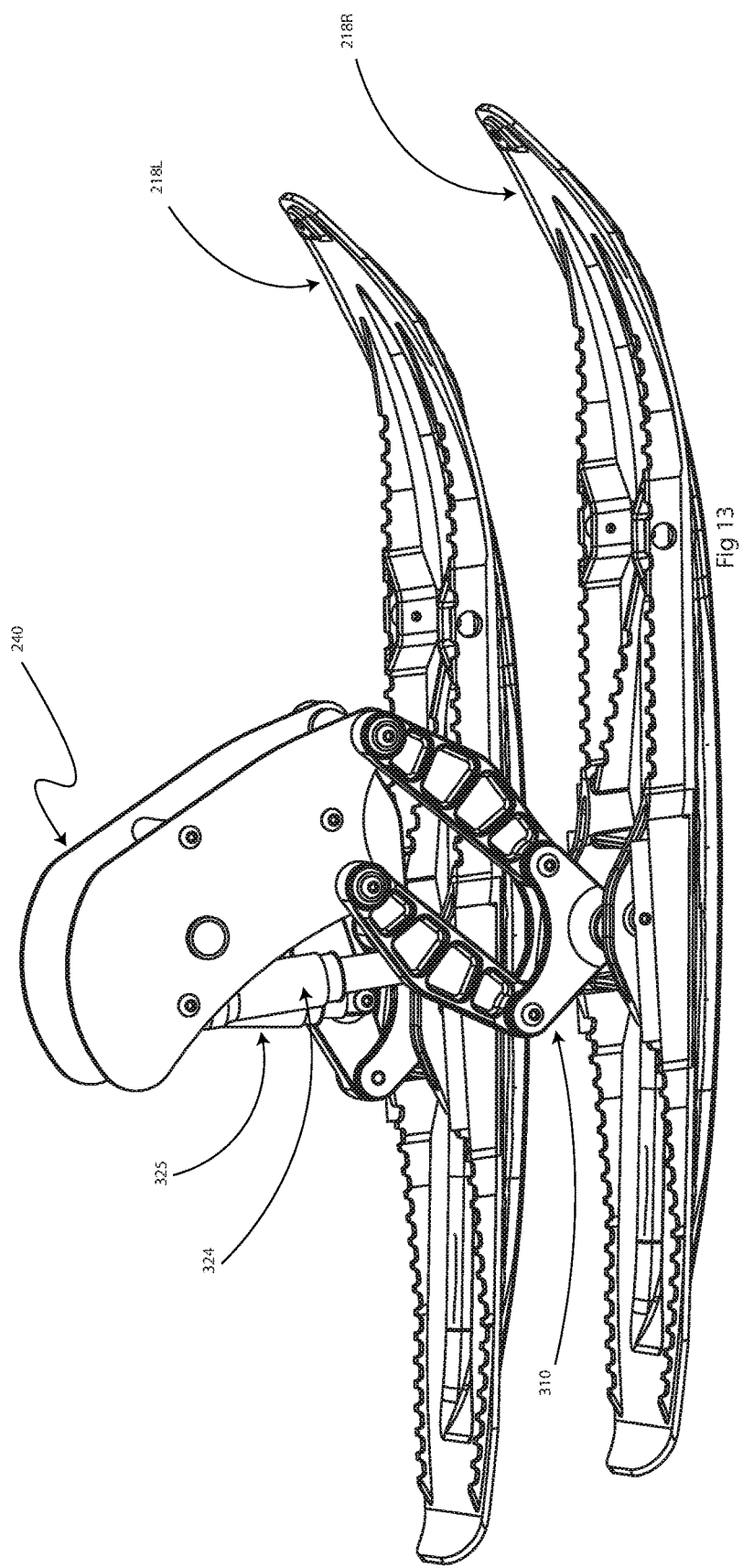

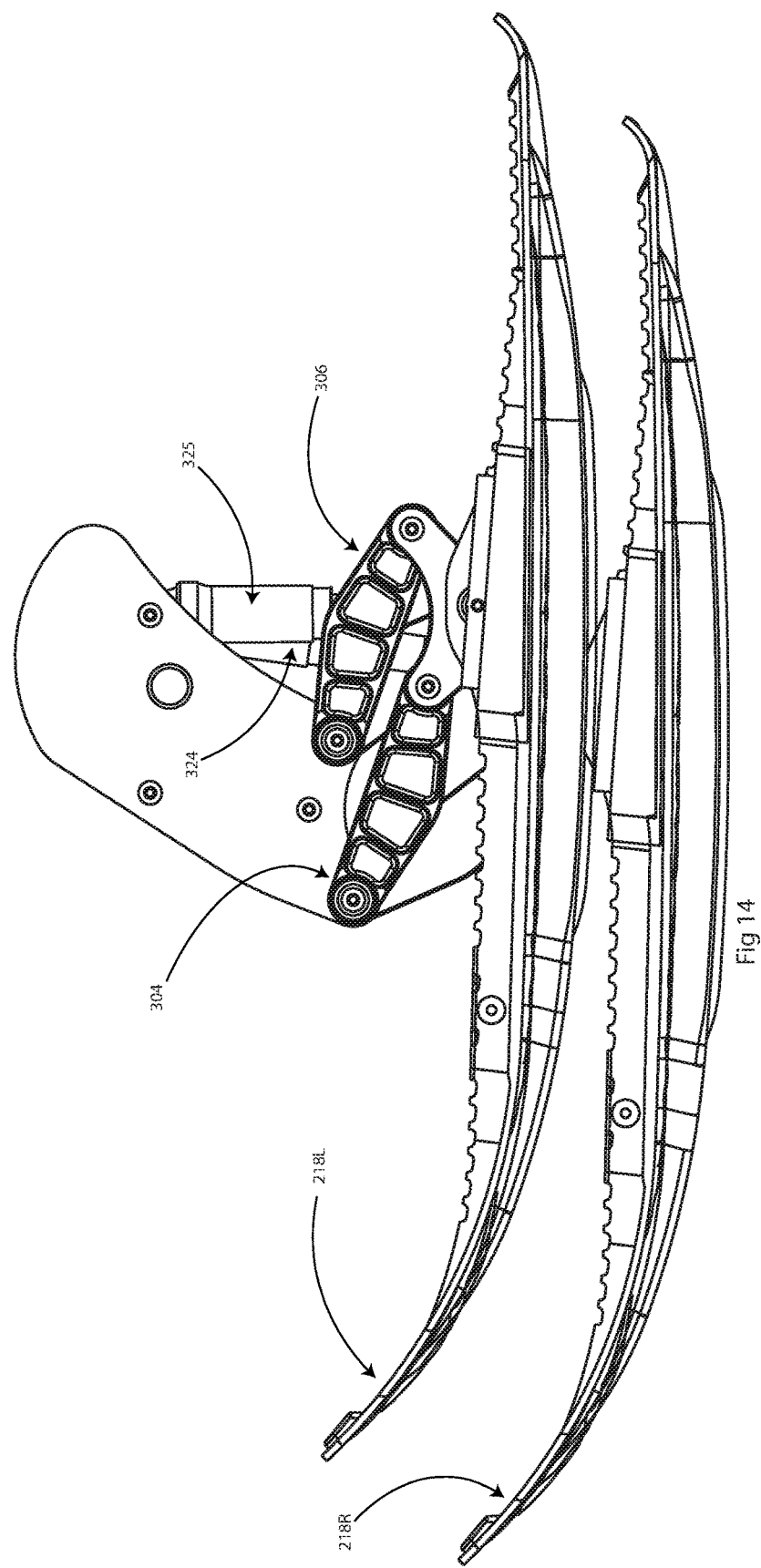

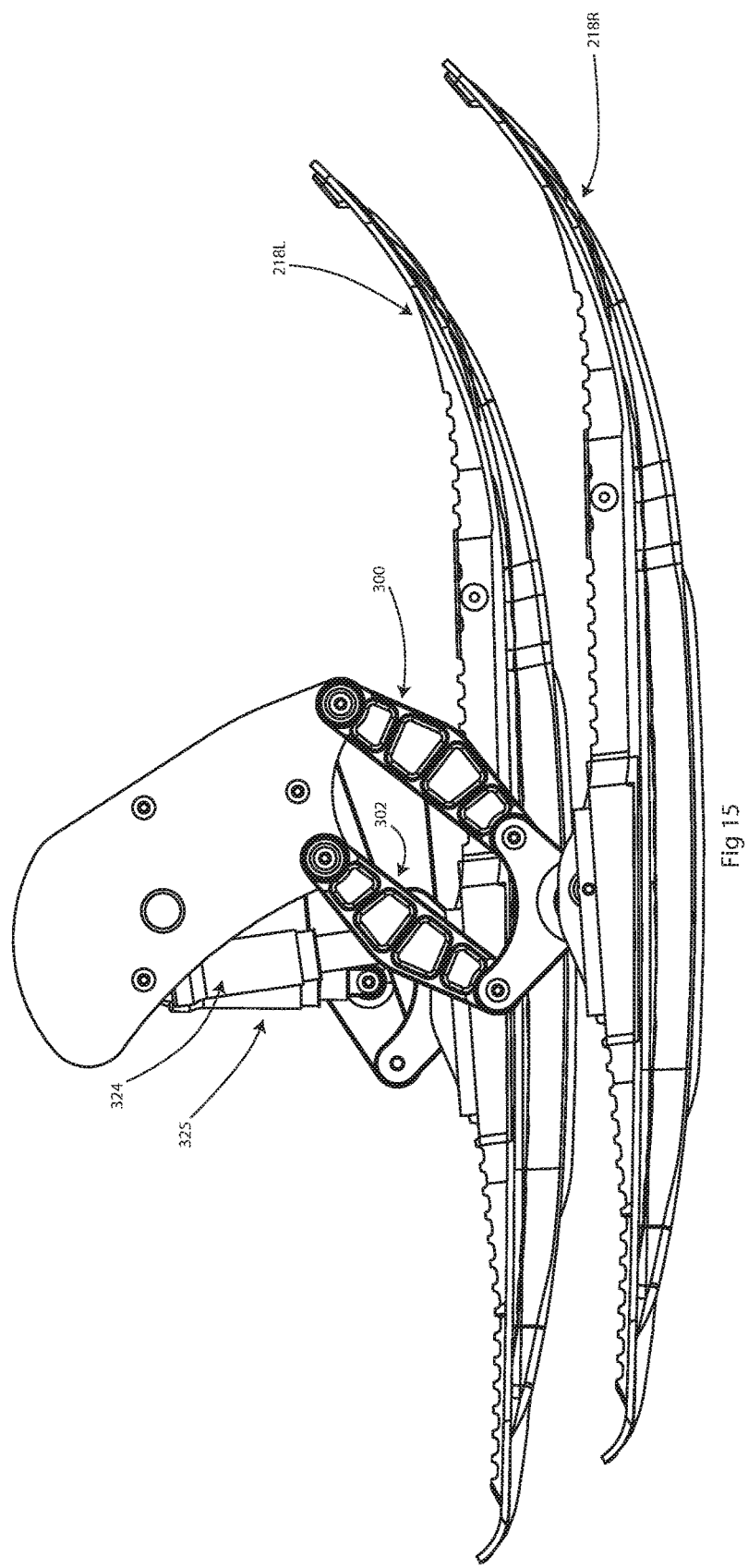

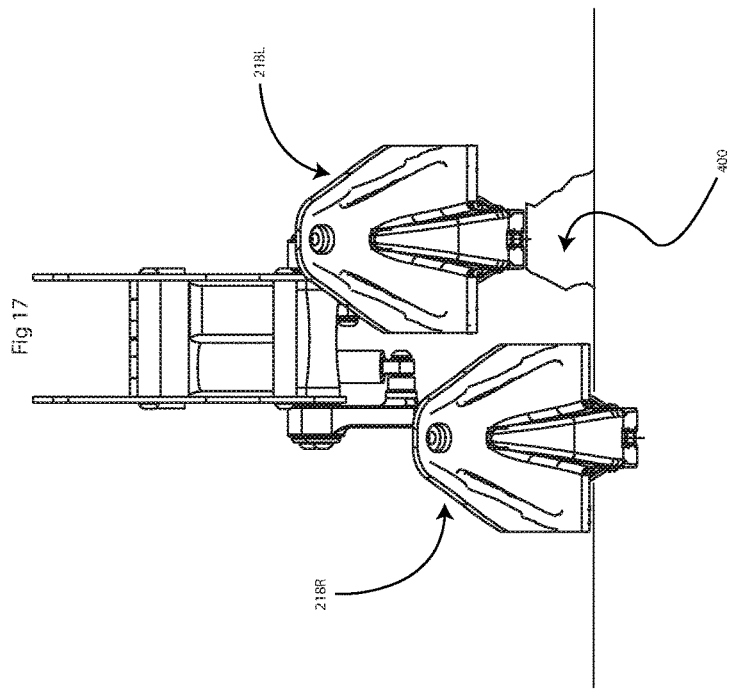
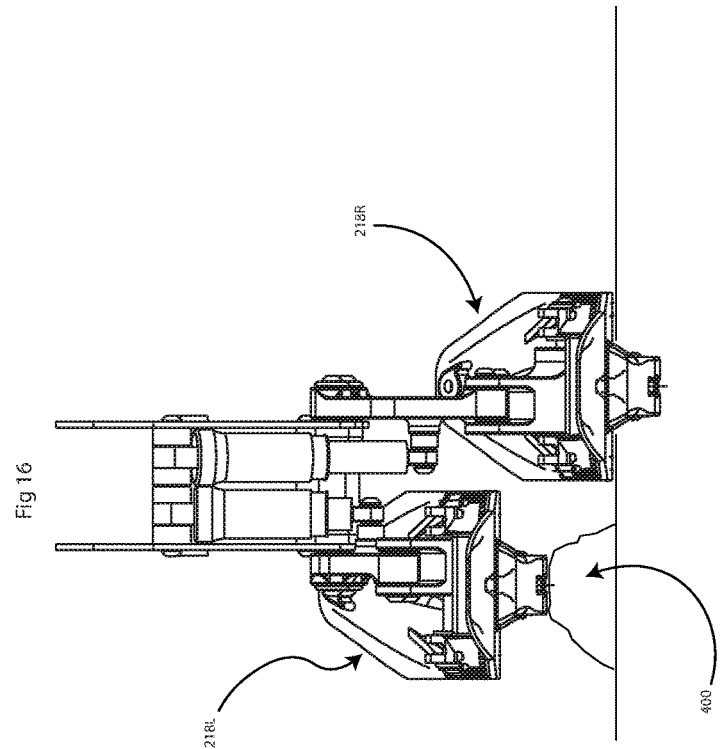

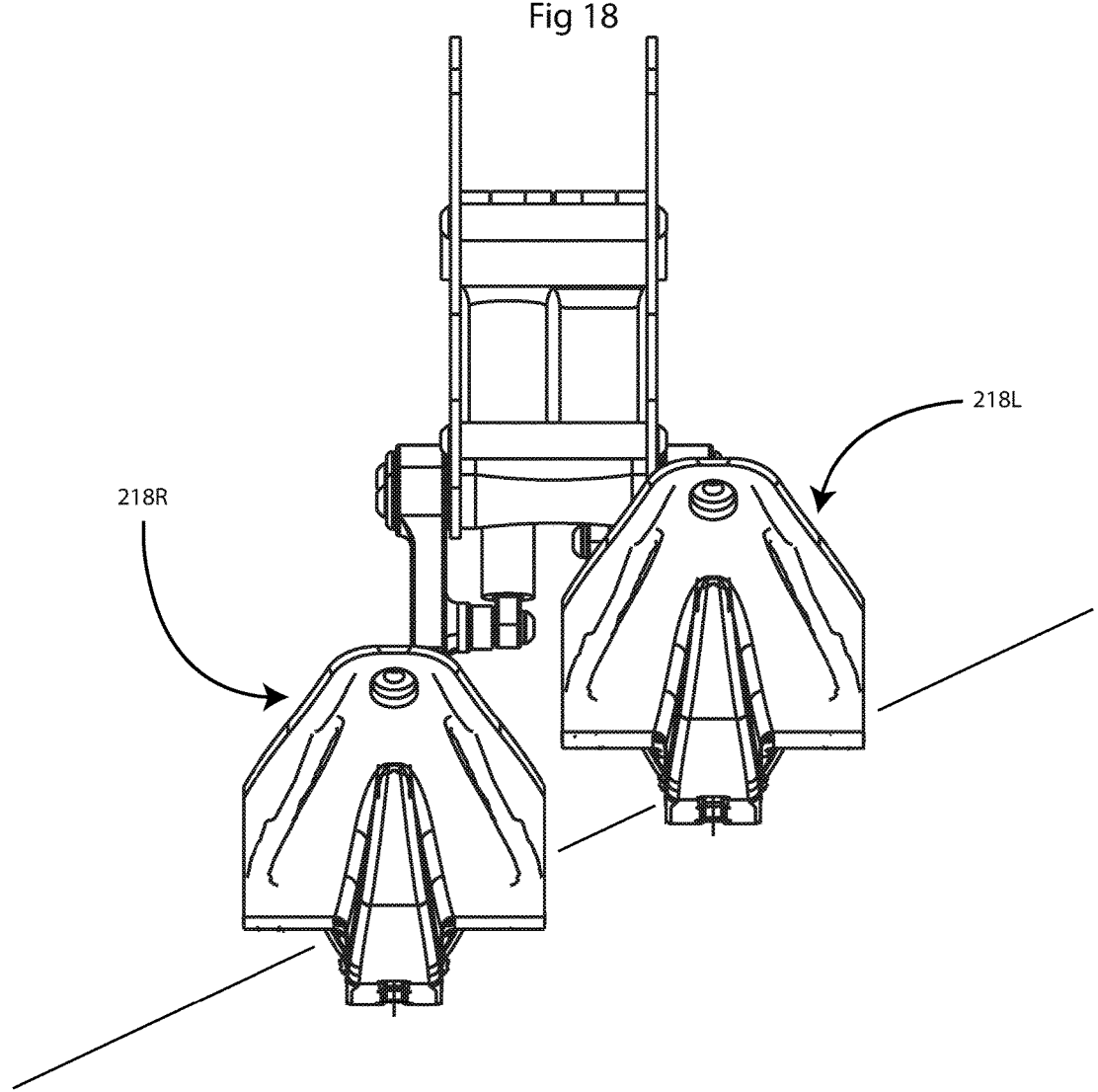

SNOW VEHICLE

The present application is a continuation-in-Part of patent application Ser. No. 14/935,224, filed Nov. 6, 2015, and Ser. No. 14/935,265, filed Nov. 6, 2015, the subject matter of which is disclosed herein by reference.

BACKGROUND

The present disclosure relates to snow vehicles including snowmobiles and or snow bikes and in particular a front suspension for the same.

Many types of vehicles are configured with tracks to drive in the snow. Regardless of whether the vehicle is a snowmobile or a wheeled vehicle converted to a tracked vehicle, tracked vehicles typically include a front suspension system that supports a ski and is coupled to the frame. In the case of snow bikes, the front suspension comprises the suspension of the motorbike or dirt bike, that is, a front shock absorber. In the case of snowmobiles, the front suspension is typically includes two control arms, also known as double A-arms. However the front snowmobile suspension can also be a trailing arm suspension. The suspension described herein would typically supplement any of the front suspensions discussed above, although it could also be the primary suspension.

One such snow vehicle is shown in our U.S. Pat. No. 8,910,738, the subject matter of which is incorporated herein by reference. This patent discloses a conversion of a motorbike into a snow vehicle where the motorbike powertrain is utilized to power the track of the converted snow vehicle.

SUMMARY

In a first embodiment, a snow vehicle comprises a frame; a propulsion unit coupled to the frame; at least one front ski; a steering mechanism coupled to the frame; a first front suspension coupled to the frame; a second front suspension positioned intermediate the first front suspension and the at least one ski; a rear suspension coupled to the frame, the rear suspension comprising: at least one slide rail; at least one control arm coupled between the slide rail and the frame; at least linear force element coupled between the slide rail and the frame; and at least one carrier roller coupled to the at least one slide rail; and a drive system comprising a drive track slidably guided by the at least one slide rail and drivably coupled to the propulsion unit.

In a second embodiment, a front suspension for a snow vehicle comprises a spindle body; a knuckle for coupling to a ski of the snow vehicle; and at least one control arm coupled intermediate the spindle body and the knuckle.

In another embodiment, a front suspension is provided for a snow vehicle having two front skis, and comprises a spindle body; at least two control arms coupled to the spindle body; and a linear force element coupled between each control arm and the spindle, whereby each control arm is attachable to one of the skis, and each control arm is movable independently of the other.

BRIEF DESCRIPTION OF THE DRAWINGS

The invention will now be described in relation to the drawing Figures where:

FIG. 2A shows a left front perspective view of the front suspension coupled to the snow vehicle;

FIG. 2B is a front suspension similar to that of FIG. 2A showing the front suspension coupled to a conventional snowmobile;

FIG. 5 is a view similar to that of FIG. 3 showing the suspension in an exploded manner;

FIG. 7 shows a right front perspective view of an alternate front suspension with two skis and an independent suspension for each ski;

FIG. 8 shows a right rear perspective view of the front suspension of FIG. 7;

FIG. 9 shows a side perspective view of the front suspension of FIG. 7;

FIG. 10B is an enlarged portion of the linkage assembly shown in FIG. 10;

FIG. 10C is an enlarged portion of the shock absorber mounting as shown in FIG. 10;

FIG. 11 shows a right front perspective view similar to that of FIG. 7 with the left ski lifted relative to the right ski;

FIG. 12 shows a right rear perspective view with the left ski lifted relative to the right ski;

FIG. 13 shows a right side perspective view with the left ski lifted relative to the right ski;

FIG. 14 shows a left side view with the left ski lifted relative to the right ski;

FIG. 15 shows a right side view with the left ski lifted relative to the right ski;

FIG. 16 shows a rear view with the left ski lifted relative to the right ski to clear an obstacle;

FIG. 17 shows a front view with the left ski lifted relative to the right ski to clear an obstacle; and FIG. 18 shows a front view with the left ski lifted relative to the right ski to ride on a slope.

DETAILED DESCRIPTION OF THE EMBODIMENTS

Figure 1:
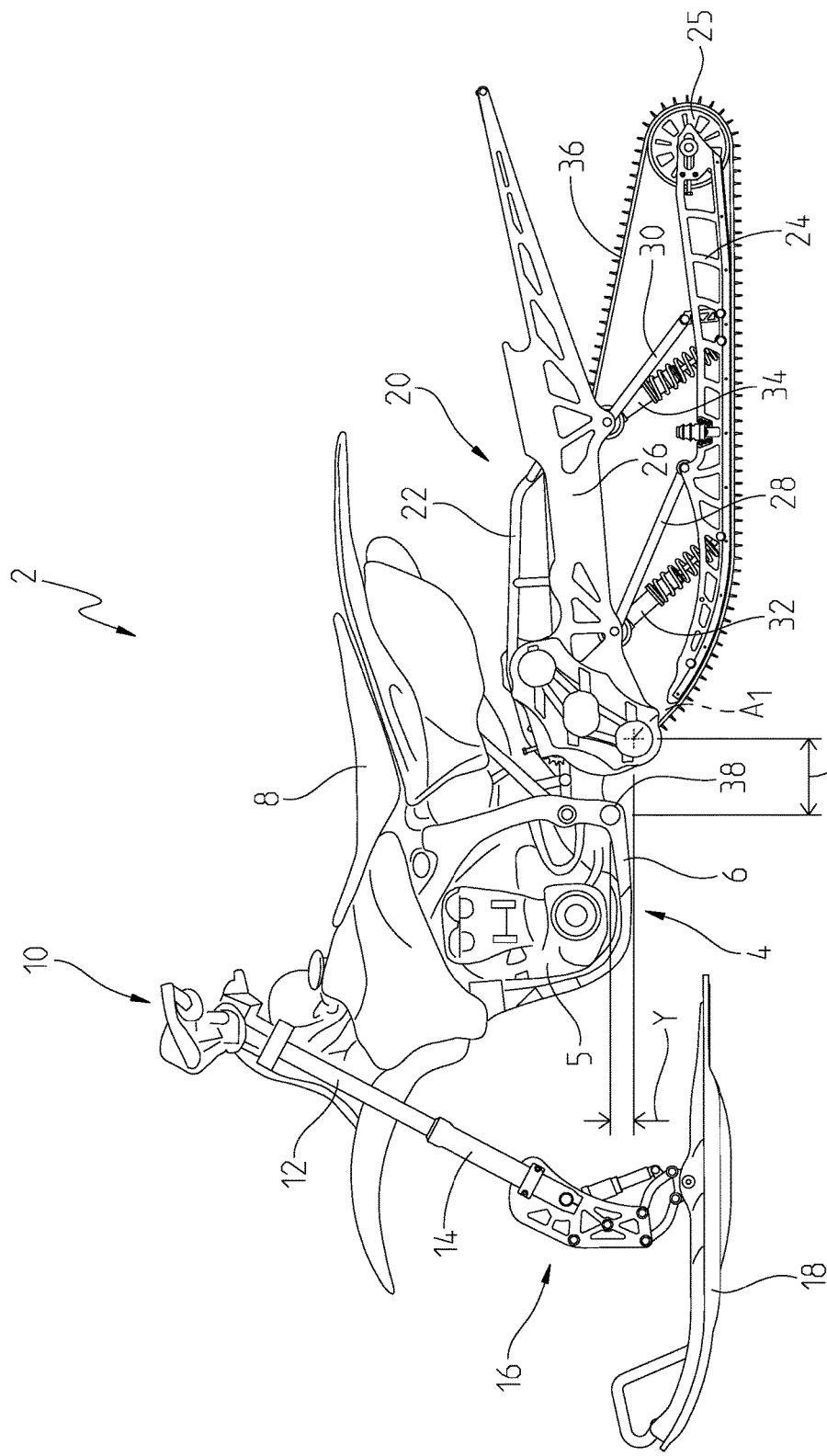
FIG. 1 is a side view of one of the embodiments of snow vehicle as disclosed in the present disclosure.

With reference first to FIG. 1, a snow vehicle is shown generally at 2 as comprised of a motorcycle portion 4 having a propulsion unit 5, which is shown as a two-cylinder motorcycle engine, a frame 6, an operators seat 8, and a steering assembly 10 which includes a front fork 12. A first suspension member is shown at 14 as a shock absorber assembly axially coupled with the forks 12. A second front suspension assembly is shown at 16 which couples the steering assembly 10 directly to a ski 18. A full description of the entire snow vehicle is described in our co-pending patent application Ser. No. 14/935,224, filed Nov. 6, 2015, incorporated herein by reference.

A rear suspension assembly 20 is shown having an upper frame portion 22, slide rails 24, carrier rollers 25, side panels 26, control arms 28, 30, linear force elements 32 and 34

(shown as shock absorbers) and an endless belt or drive track 36. As shown, the control arms 28, 30 and the linear force elements 32 and 34 are coupled between the slide rail 24 and the frame 22. A carrier roller 25 is coupled to the slide rail 24. A drive system 36 comprising a drive track 40 is slidably guided by the slide rail 24 and is drivably coupled to the propulsion unit 5.

With reference now to FIGS. 2A and 3-5, the front suspension assembly 16 will be described in greater detail. As shown best in FIGS. 3 and 4, front suspension assembly 16 generally includes a spindle body 40, a lower linkage portion 42, and a mounting portion 44. As shown best in FIG. 5, spindle body 40 is generally comprised of two plates 50 and 52 where each plate includes a plurality of apertures. Namely, plate 50 includes apertures 50a-50g together with an enlarged aperture at 50h. Likewise, plate 52 includes apertures 52a-52g and an enlarged aperture at 52h. Spindle body 40 also includes a plurality of spacers to space the plates 50 and 52 apart, namely spacers 54a, 54b, 54c, and 54g. An enlarged spacer is provided at 54h. It should be noted each of the spacers 54a, 54b, 54c, and 54g are somewhat spool-shaped having an enlarged head portion 56 at each end as well as threaded openings 58 at each end. Enlarged spacer 54h is embossed at each end to define a reduced diameter section 60 defining shoulders 62.

Figure 3:
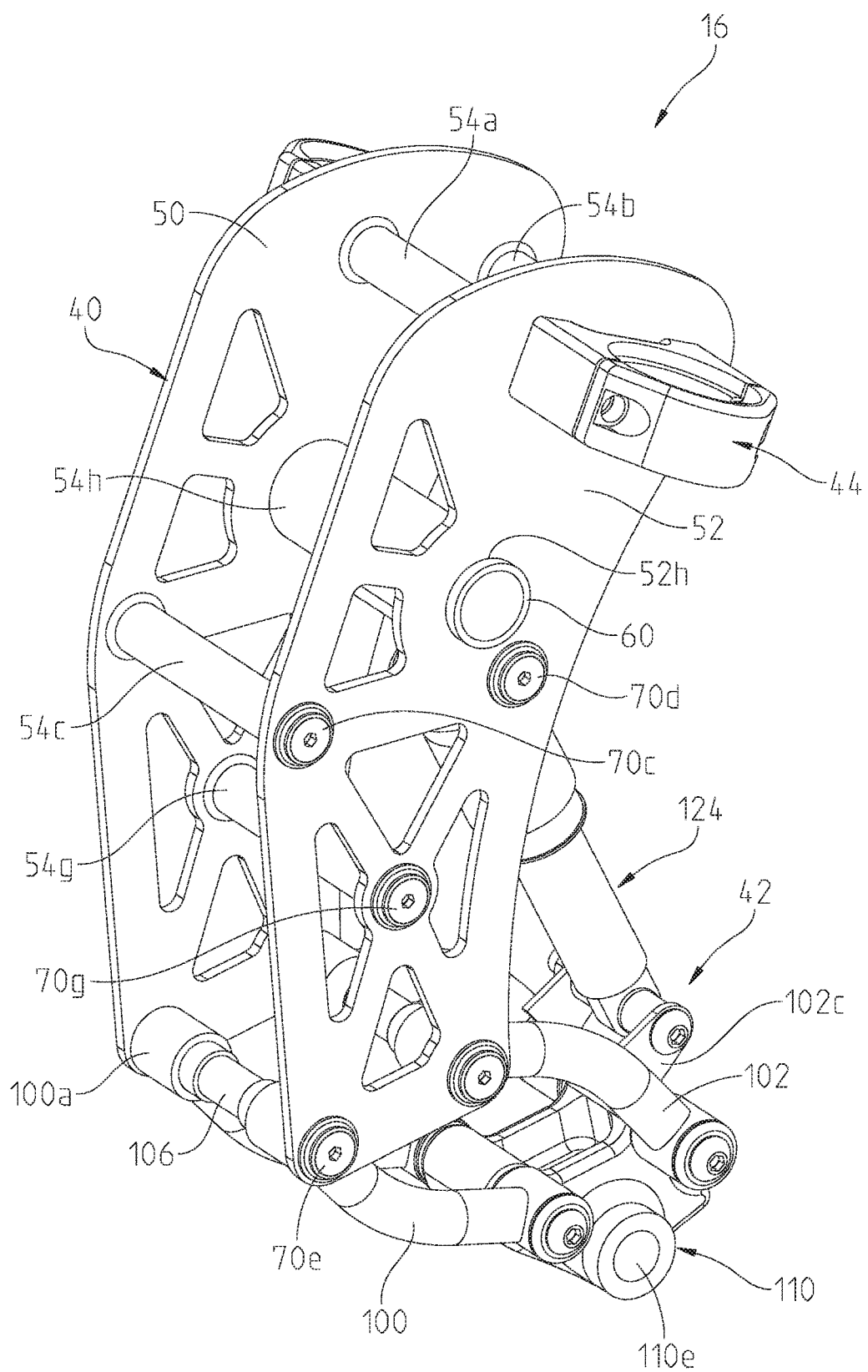
FIG. 3 is a front left perspective view of the suspension assembly.
Figure 4:
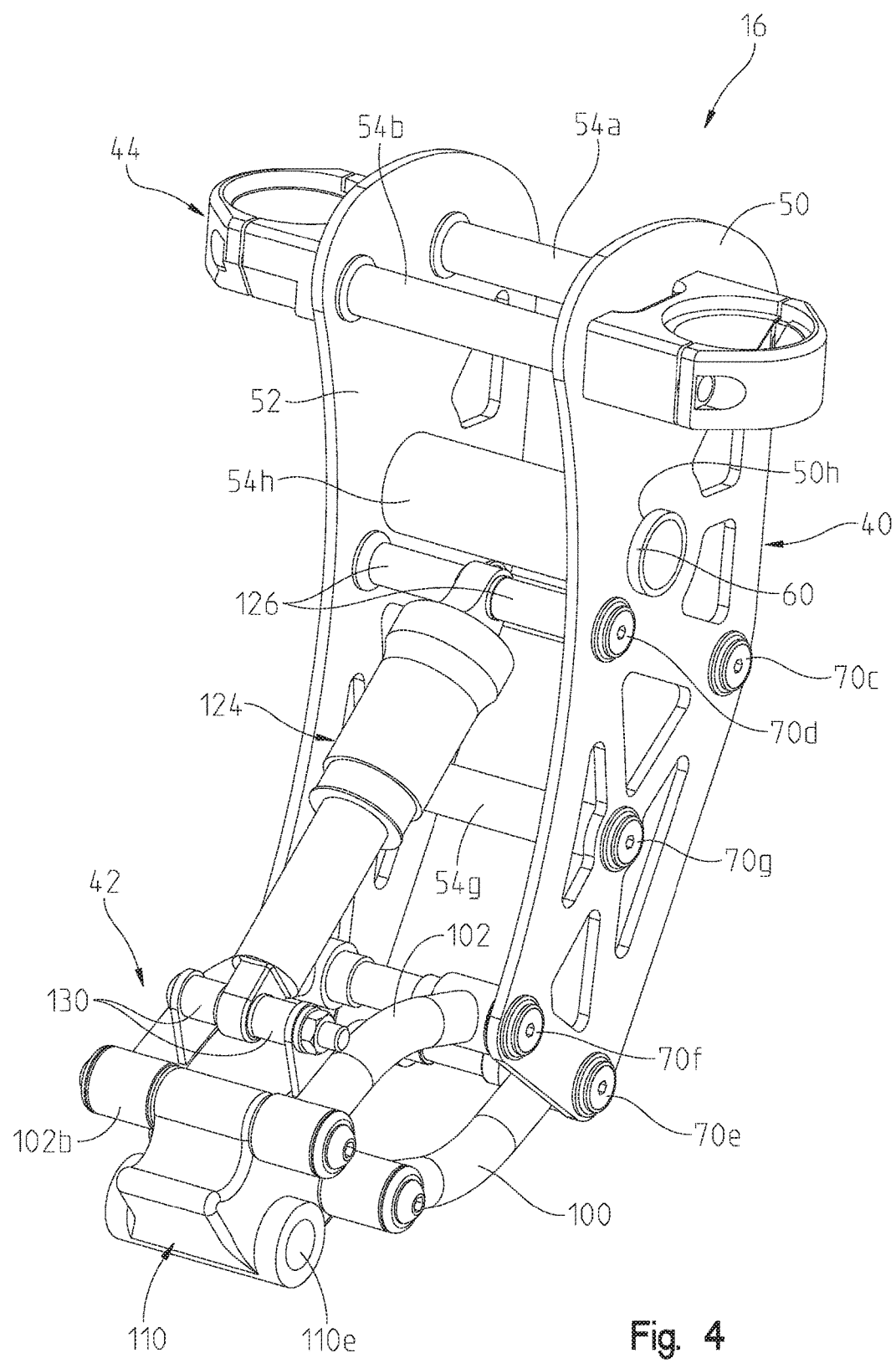
FIG. 4 is a rear right perspective view of the suspension assembly of FIG. 3.

Thus, the spindle body may be preassembled by placing the reduced diameter portion 60 of spacer 54h into respective apertures 50h and 52h. This positions the reduced diameter portion 60 through the corresponding apertures 50h and 52h as shown in FIGS. 3 and 4. Spacers 54c and 54g may then be aligned with corresponding apertures 50c, 52c; and 50g, 52g. Fasteners and washers may then be positioned against plates 50 and 52 to retain the two plates together and coupled to the spacers. Namely, fastener 70c and washer 72c may be aligned with aperture 52c and brought into threaded engagement with threaded aperture 58 of spacer 54c. Likewise, fasteners 70g and washers 72g may be received through apertures 50g and 52g to be received into the threaded ends 58 of spacer 54g. The fasteners should be brought into engagement with the threaded apertures of their corresponding spacers but not fully torqued down at this position as other spacers and assembly is required within the spindle assembly.

With reference still to FIG. 5, mounting portion 44 is shown including clamp halves 80, 82; 84, 86. Each of the pairs of clamp halves includes semi-cylindrical openings which may encompass the front forks of the motorcycle frame as described above with reference to FIG. 1. Thus, spacers 54a and 54b are now aligned with respective pairs of apertures 50a, 50b; 52a and 52b; and fasteners 70a and 70b are received through their respective apertures as shown in FIG. 5. This brings fasteners into engagement with the threaded ends 58 of the corresponding spacers 54a and 54b to a position where the clamp may be closed.

Figure 5A:
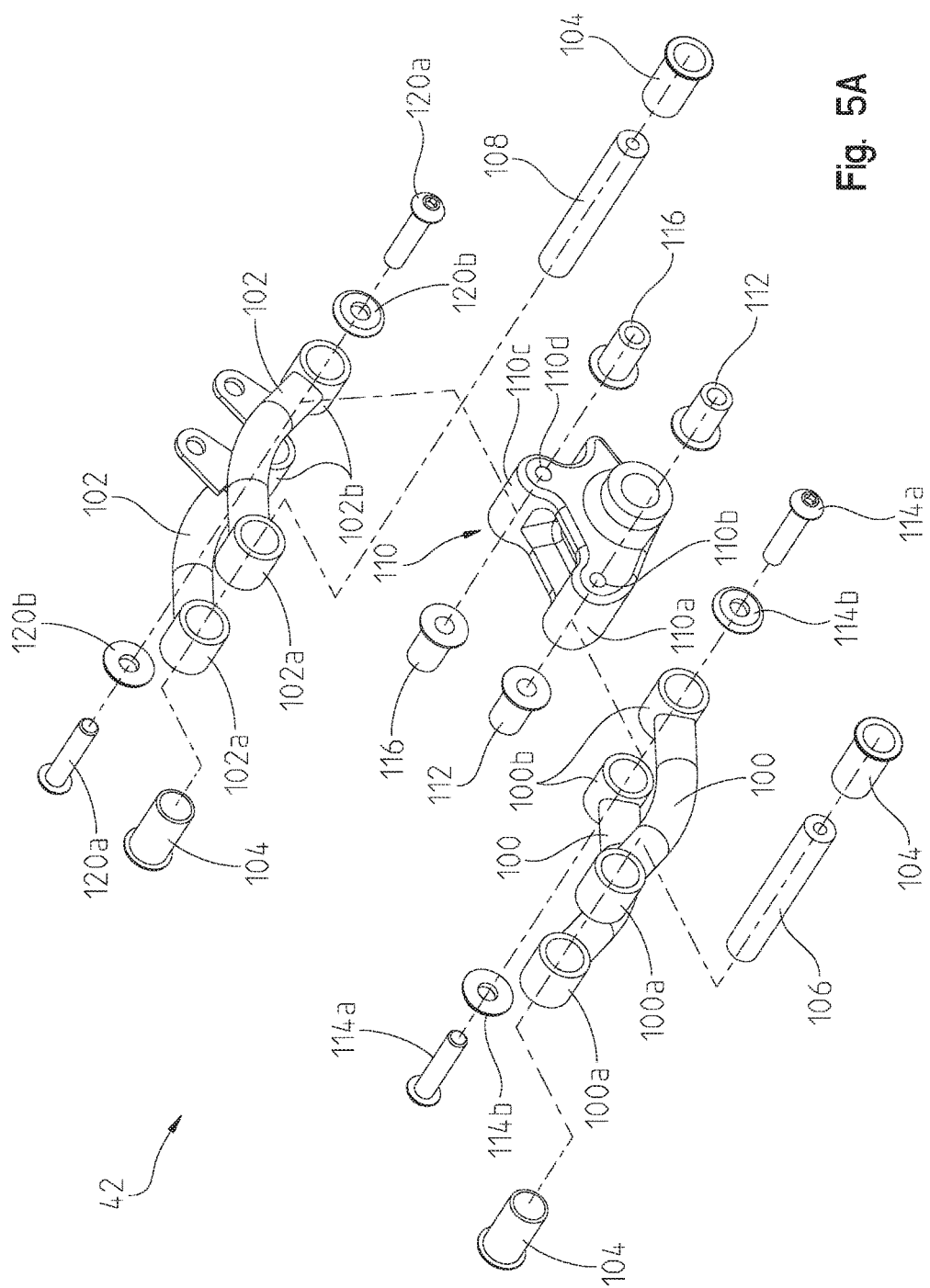
FIG. 5A is an enlarged portion of the linkage assembly shown in FIG. 5.

With reference now to FIG. 5A, the link assembly 42 is shown and will be described in greater detail. As shown best in FIG. 5A, link assembly 42 includes front links or control arms 100 and rear links or control arms 102. Each control arm 100 includes an upper coupling 100a and a lower coupling at 100b. Likewise, control arms 102 include upper couplings at 102a and lower couplings at 102b. Each of the upper couplings 100a and 102a receive sleeves 104 which are profiled to be received in the couplings 100a, 102a. Spacers 106 and 108 respectively, are then inserted through corresponding couplings 100a, 102a and into sleeves 104. Likewise, spacer 108 is received into couplings 102a, and into sleeves 104. Thus, control arms 100 and 102 may be aligned with respective apertures 50e, 52e, and 50f, 52f (FIG. 5) and fastened to the spindle assembly by way of fasteners and washers 70e, 72e and 70f, 72f.

With reference again to FIG. 5A, linkage assembly 42 further includes a knuckle 110 having a front pivot coupling 110a having an aperture at 110b and a rear pivot coupling 110c having an aperture 110d. Sleeves 112 may be received in lower couplings 100b of control arms 100 (in the orientation shown in FIG. 5A) and then couplings 100b may be received in alignment with apertures 110b whereupon fasteners 114a and washers 114b may be aligned with threaded apertures 110b to couple control arms 100 with the knuckle 110. In a like manner, sleeves 116 may be received in lower couplings 102b (in the orientation shown in FIG. 5A) whereby couplings 102b and sleeves 116 are received over rear pivot coupling 110c and in alignment with threaded apertures 110d. Thereafter, fasteners 120a and washers 120b may be aligned with sleeves 116 to couple alignment arms 102 with knuckle 110.

Figure 5B:
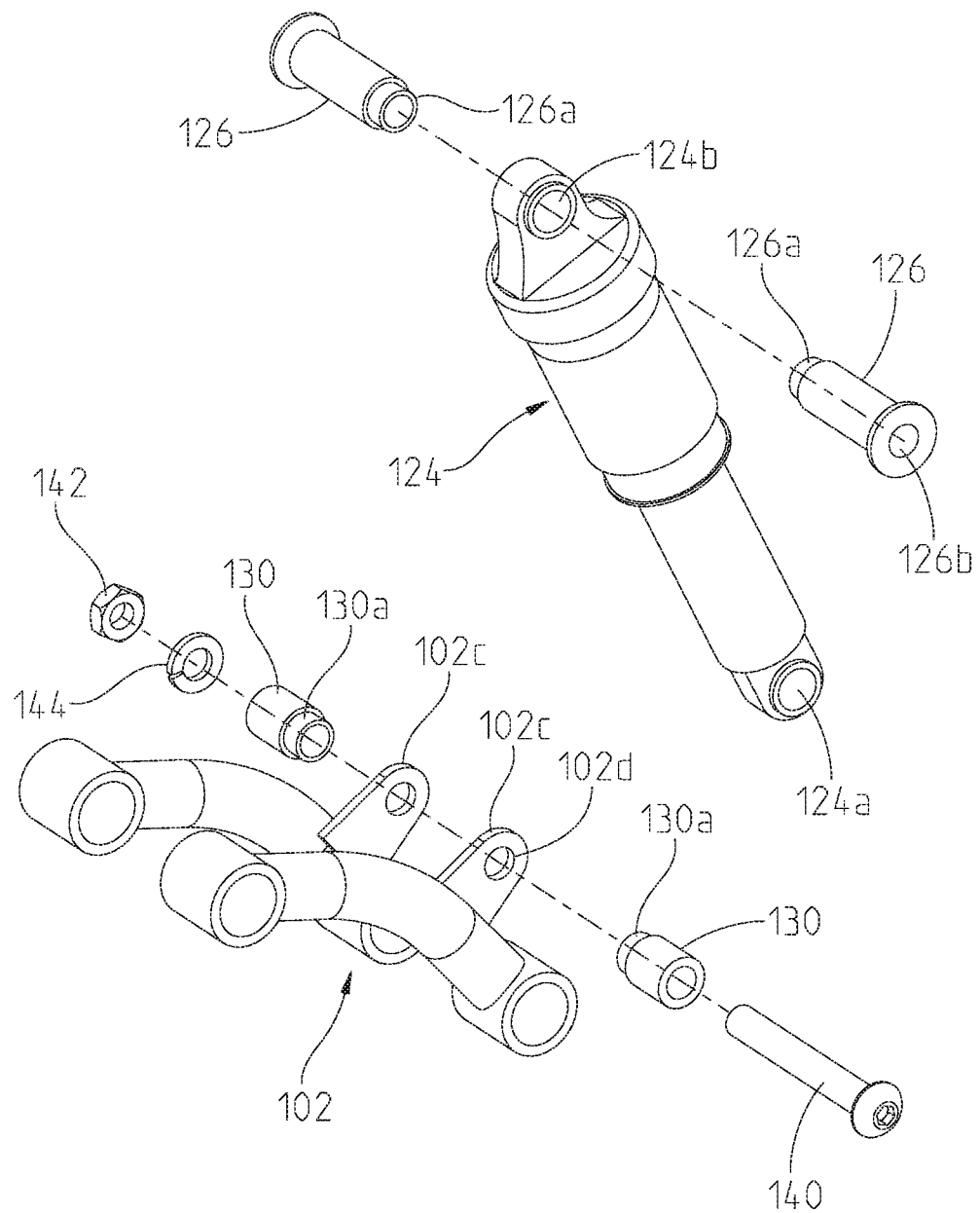
FIG. 5B is an enlarged portion of the shock absorber mounting as shown in FIG. 5.

Finally, with reference to FIG. 5B, linkage 42 further includes a shock absorber 124 having a lower coupling at aperture 124a and an upper coupling at aperture 124b. Split sleeves 126 include reduced diameter portions 126a and threaded apertures at 126b. Split sleeves 126 may be positioned with reduced diameter portions 126a in apertures 124b and the shock may be coupled to the spindle assembly by way of fasteners 70d and washers 70e positioned through apertures 50d (FIG. 5) and into threaded engagement with threaded apertures 126b. The lower aperture 124a of shock 124 may then be coupled to bracket arms 102c as shown in FIG. 5B. Sleeves 130 are positioned with reduced diameter portions 130a within the shock aperture 124a. The sleeves 130 and the shock aperture 124a are then aligned with apertures 102d whereupon fastener 140 may be received through sleeves 130, apertures 102d and receive a fastener 142 and lock washer 144. Thus, the entire assembled second suspension system 16 is shown in FIGS. 3 and 4 where knuckle 110 is shown as providing an aperture 110e for coupling to ski 18 as shown above in FIG. 2A. That is, ski 18 includes ski rails 18a whereby a pin 18b may be received through the rails and into aperture 110e for retaining ski 18 to the second suspension system 16. Ski 18 could be similar to that shown in U.S. Pat. No. 8,381,857, the subject matter of which is incorporated herein by reference.

Figure 6A:
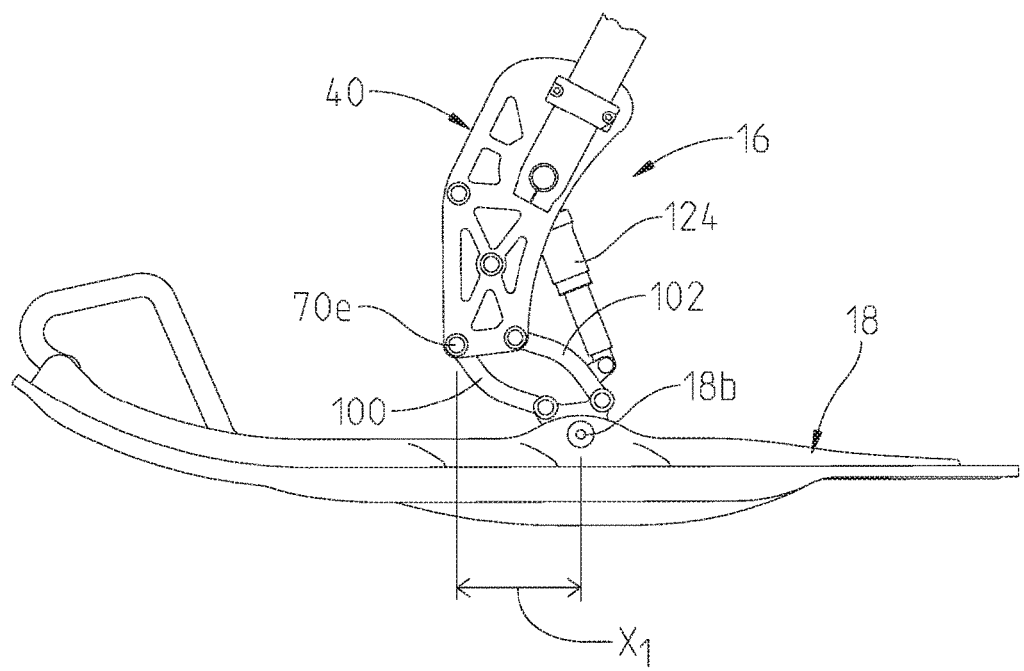
FIG. 6A shows a side view of the front suspension coupled to a ski in the fully extended position.
Figure 6B:
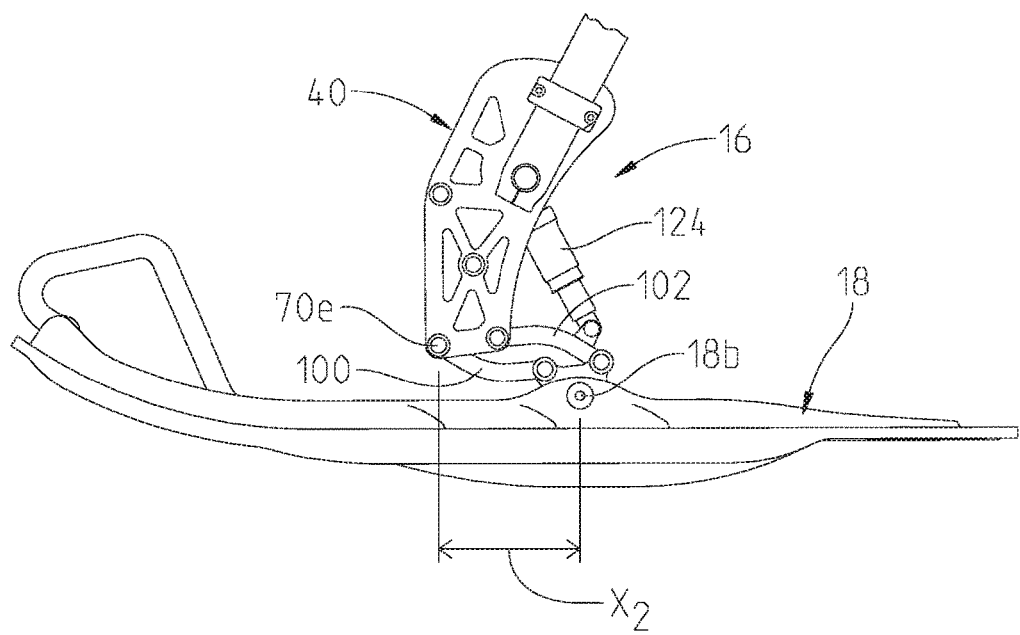
FIG. 6B shows the front suspension of FIG. 6a in a full trounce position.

Thus, in operation and with reference to FIGS. 6A and 6B, ski 18 is shown in a fully extended position in FIG. 6A and in a full trounce position in FIG. 6B. As shown in FIG. 6B, control arms 100 and 102 are shown collapsed with the shock absorber 124 in a stroked position. Advantageously, the ski is lifted up and rearwardly relative to spindle assembly 40. It is lifted upwardly in the sense that it rotated (in the clockwise sense as viewed in FIG. 6B). It is rotated in the range of 1-5°. It also moves rearwardly, for example, the position of the pin 18b which couples the ski to knuckle 110 moves rearwardly from the positions shown in FIG. 6A to the position shown in FIG. 6B. That is, the distance in FIG. 6A between the upper pivot point of front control arm 100 (about fastener 70e) is shown as $X_1$, whereas in FIG. 6b the distance is shown as $X_2$, where $X_2$ is greater than $X_1$. This provides an enhanced suspension system in that the ski is lifted up and rearward; for example, if the snow bike is going over a rock or log, the ski is lifted up and over the log rather than pushing the ski into the log. This movement also reduces the friction between the ski and the snow due to the lifting of the ski.

It should be understood that the spindle assembly may also be usable on a conventional snowmobile, and as shown in FIG. 2B, spindle 16' is shown coupled to upper and lower alignment arms or control arms 150, 152, where upper control arm 150 is coupled to spindle assembly 16' by way of a ball joint at 154. Although not shown in FIG. 2B, lower control arm 152 would also be coupled by way of a ball joint to spindle assembly 16'. It should be further understood that spindle assembly 16 or 16' could be adapted for use with a trailing arm type snowmobile suspension of the type shown in U.S. Pat. No. 6,328,124, the subject matter of which is incorporated herein by reference.

With reference now to FIGS. 7-10C, a second embodiment of the front suspension assembly will be described. As shown best in FIGS. 7-9, front suspension assembly 216 is shown, but in this embodiment, the suspension 216 is coupled to two skis 218 (Left ski 218L and right ski 218R). Front suspension assembly 216 generally includes a spindle body 240, and a lower linkage portion 242. The front suspension 216 would also include a mounting portion similar to that as shown at 44 in FIG. 3, for connection to the forks 12. In this embodiment, front suspension assembly 216 includes an independent suspension for each one of the skis 218, as discussed herein.

Figure 10:
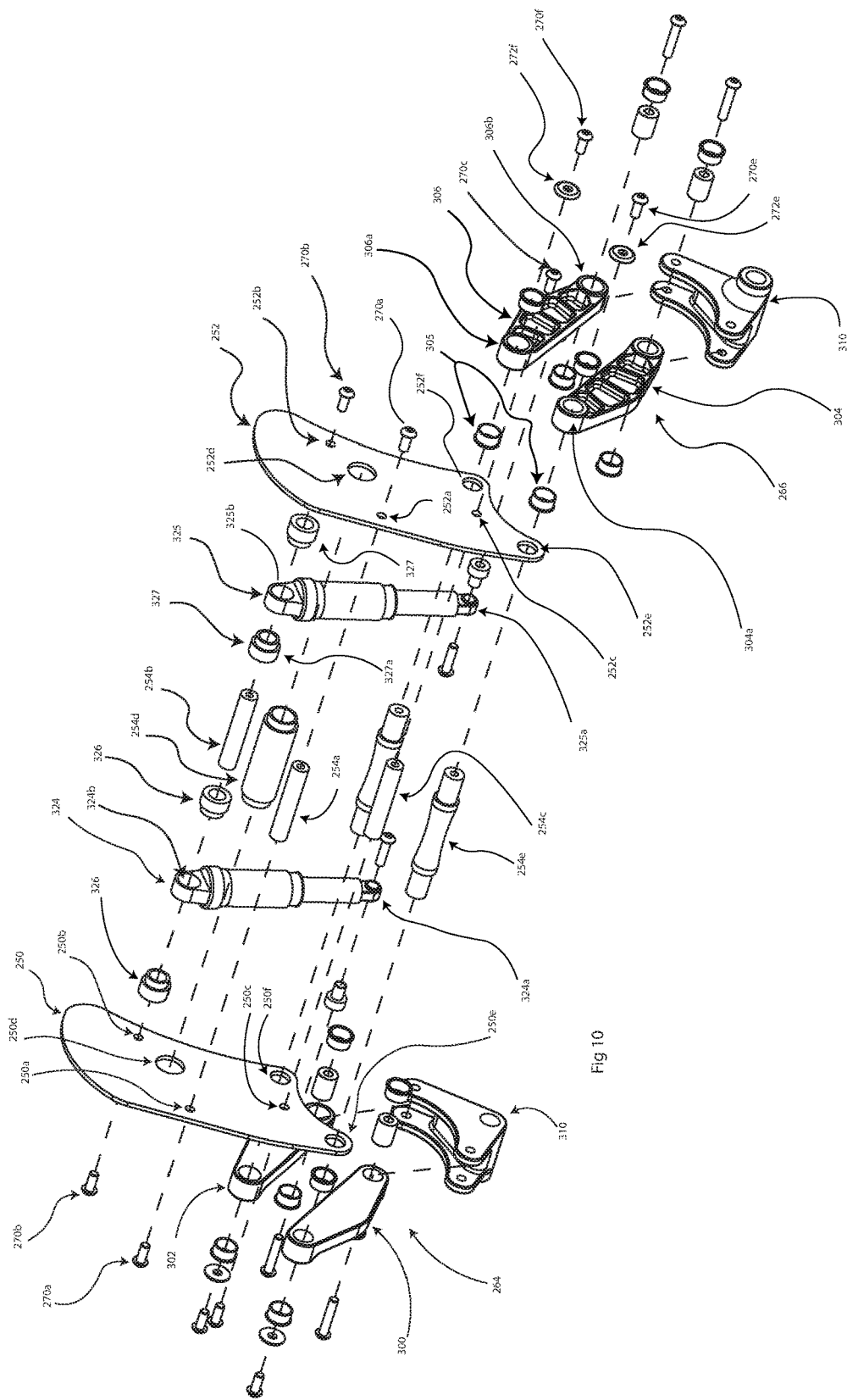
FIG. 10 shows an exploded view of the front suspension of FIG. 7.
Figure 10A:
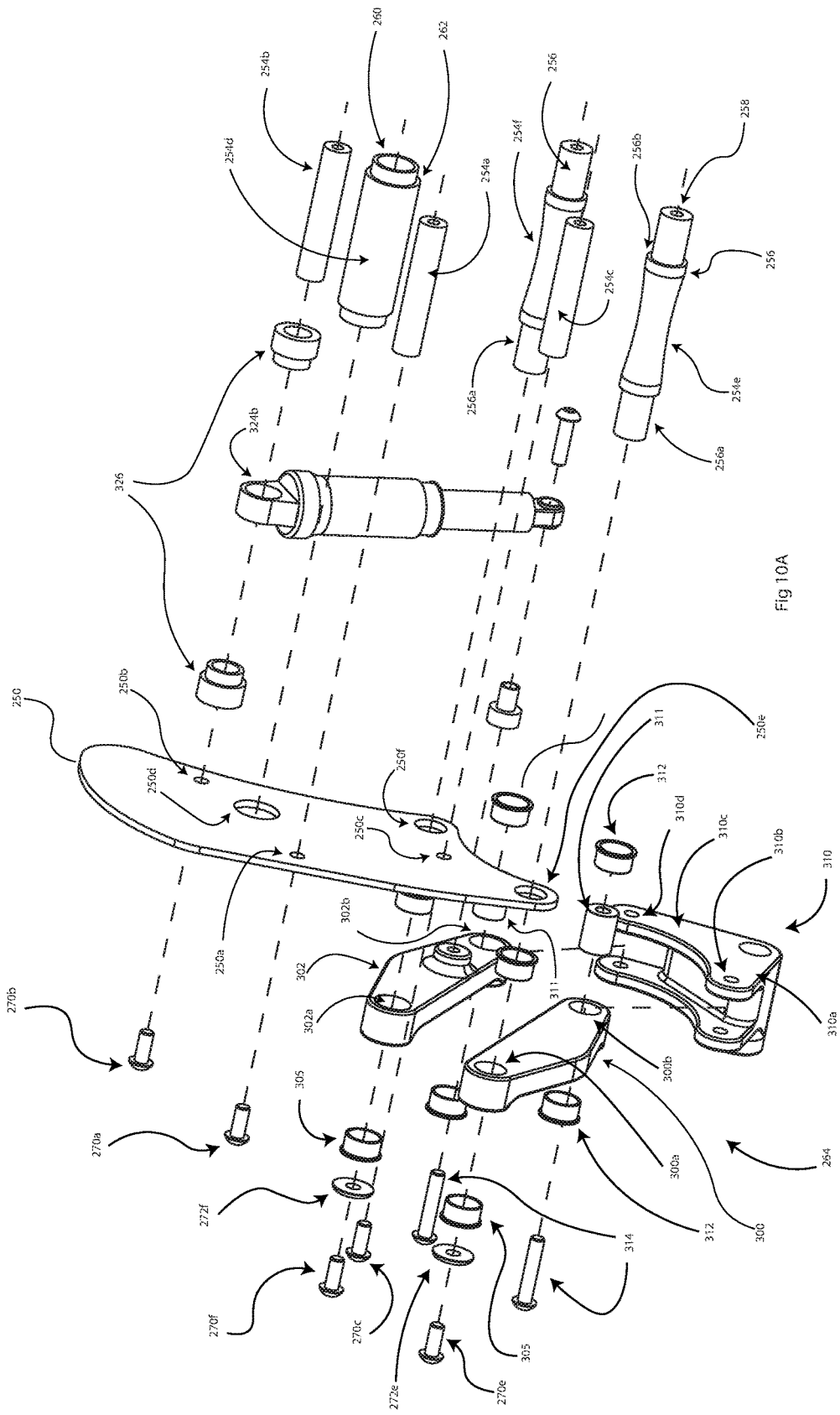
FIG. 10A is an enlarged portion of the spindle assembly shown in FIG. 10.

As shown best in FIGS. 10-10C, spindle body 240 is generally comprised of two plates 250 and 252 where each plate includes a plurality of apertures. Namely, plate 250 includes apertures 250a-250c together with enlarged apertures at 250d-250f. Likewise, plate 252 includes apertures 252a-252c and enlarged apertures at 252d-252f. Spindle body 240 also includes a plurality of spacers to space the plates 250 and 252 apart, namely spacers 254a, 254b, 254c, 254e and 254f. An enlarged spacer is provided at 254d. It should be noted that each of the spacers 254e and 254f are somewhat spool-shaped having an enlarged head portion 256 (FIG. 10A) at each end as well as threaded openings 258 at each end (FIG. 10A). Enlarged head portion 256 defines reduced diameter portion 256a and shoulder 256b (FIG. 10A). Enlarged spacer 254d is embossed at each end to define a reduced diameter section 260 defining shoulders 262 (FIG. 10A).

Thus, the spindle body 240 may be preassembled by placing the spacers 254d, 254e and 254f between the plates 250 and 252. This is done by placing the reduced diameter portions 260 of spacer 254d into respective apertures 250d and 252d; by placing the reduced diameter portions 256a of spacer 254e into respective apertures 250e and 252e; and by placing the reduced diameter portions 256a of spacer 254f into respective apertures 250f and 252f (FIGS. 10 and 10A). This positions the reduced diameter portions 260 through their corresponding apertures as shown in FIG. 7. This also positions the reduced diameter portions 256a through their corresponding apertures (250e, 250f, 252f, 252f) as the shoulders 256b abut the plates 250, 252.

Spacers 254a and 254c are also installed by aligning them with corresponding apertures 250a, 252a and 250c, 252c. Fasteners may then be positioned against plates 250 and 252 to retain the two plates together and coupled to the spacers. Namely, fastener 270a (FIG. 10A) may be aligned with aperture 250a of plate 250 and brought into threaded engagement with threaded aperture of spacer 254a. Likewise, fastener 270a may be aligned with aperture 252a of plate 252 (FIG. 10) and received into the threaded aperture of spacer 254a. Also fastener 270c (FIG. 10A) may be aligned with aperture 250c of plate 250 and brought into threaded engagement with threaded aperture of spacer 254c. Likewise, fastener 270c may be aligned with aperture 252c of plate 252 (FIG. 10) and received into the threaded aperture of spacer 254c.

With reference still to FIGS. 10-10C, the link assembly 242 will be described in greater detail. As shown best in FIG. 10, link assembly 242 includes two independent suspensions, namely a right suspension 264 and a left suspension 266. Right suspension 264 includes a front link or control arm 300 and a rear link or control arm 302. As shown best in FIG. 10A, control arm 300 includes an upper coupling 300a and a lower coupling at 300b. Likewise, control arm 302 includes an upper coupling at 302a and a lower coupling at 302b. Left suspension 266 includes a front link or control arm 304 and a rear link or control arm 306. Control arm 304 (FIG. 10) includes an upper coupling 304a and a lower coupling at 304b (FIG. 10B). Likewise, control arm 306 includes an upper coupling at 306a and a lower coupling at 306b (FIG. 10B).

Each of the upper couplings 300a and 302a receive sleeves 305 (FIG. 10A) which are profiled to be received in the couplings 300a, 302a. Couplings 300a and 302a of control arms 300 and 302 are then positioned over the reduced diameter portions 256a of spacers 254e and 254f which protrude through apertures 250e 250f. Thus, control arms 300 and 302 of right suspension 264 may be aligned with respective apertures 250e and 250f, (FIG. 10A) and fastened to the spindle assembly by way of fasteners and washers 270e, 272e and 270f, 272f. In a like manner, control arms 304 and 306 of left suspension 266 also receive sleeves 305 (FIG. 10) and are then positioned over the reduced diameter portions 256a of spacers 254e and 254f which protrude through apertures 252e, 252f of plate 252 (FIG. 10). Thus, control arms 304 and 306 of left suspension 266 may be aligned with respective apertures 252e and 252f, (FIG. 10) and fastened to the spindle assembly by way of fasteners and washers 270e, 272e and 270f, 272f.

With reference again to FIG. 10A, linkage assembly 242 further includes a knuckle 310 having a front pivot coupling 310a having a threaded aperture at 310b and a rear pivot coupling 310c having a threaded aperture 310d. Spacer 311 and sleeves 312 may be received in lower couplings 300b, 302b of control arms 300, 302 whereupon lower couplings 300b, 302b may be received in front and rear pivot coupling 310a, 310c and fasteners 314 may be received in alignment with threaded apertures 310b, 310d to couple control arms 300, 302 with the knuckle 310.

Finally, with reference to FIG. 10C, linkage 242 further includes shock absorbers 324, 325 having lower couplings at aperture 324a, 325a and upper couplings at 324b, 325b. Split sleeves 326, 327 include reduced diameter portions 326a, 327a. Split sleeves 326 may be positioned with reduced diameter portions 326a in apertures 324b of shock absorber 324. Likewise, split sleeves 327 may be positioned with reduced diameter portions 327a in apertures 325b of shock absorber 325. The shock absorbers 324, 325 may then be coupled to the spindle assembly by way of spacer 254b. That is, spacer 254b is positioned through sleeves 326, 327 with spacer 254b aligned with apertures 250b, 252b. Fasteners 272b are then inserted through apertures 250b, 252b and into threaded apertures of spacer 254b. This pivotally couples the two shock absorbers 324 and 325 to the spindle 240.

The lower apertures 324a, 325a of shocks 324, 325 may then be coupled to control arms 302, 306 as shown in FIG. 10C. A first sleeve 330 is positioned with a reduced diameter portion 330a within aperture 324a of shock 324. The sleeve 330 and the shock aperture 324a are then aligned with aperture 302d on boss 302e whereupon fastener 340 may be received through sleeve 330 and into aperture 302d. Likewise, a second sleeve 332 is positioned with a reduced diameter portion 332a within aperture 325a. The sleeve 332 and the shock aperture 325a are then aligned with an aperture (not seen in FIG. 10C) on boss 306e whereupon fastener 342 may be received through sleeve 332 and into the aperture.

Thus, the entire assembled second suspension system 216 is shown in FIGS. 7-9 where knuckle 310 is shown as providing an aperture 310e (FIG. 10B) for coupling to ski 218 as shown. That is, ski 218 includes ski rails 218a whereby a pin 218b may be received through the rails and into aperture 310e for retaining ski 218 to the second suspension system 216.

Thus, in operation and with reference to FIGS. 7-9, skis 218R and 218L are shown in a fully down position as the right and left suspensions are shown in their respective extended positions. However, as the suspensions 264, 266 are independent, either ski 218R or 218L may move relative to the other. For example, as shown FIGS. 11-15, the left suspension 266 is shown in a collapsed position, whereas the right suspension 264 is shown in a fully extended position. This can be seen in FIG. 12 where the shock absorber 324 is shown in its original and fully extended position, whereas shock absorber 325 is shown fully collapsed. This can also be seen in the comparison of FIGS. 14 and 15, where in FIG. 14, the control arms 304 and 306 are shown in their collapsed position, whereas in FIG. 15, the control arms 300 and 302 are shown in their fully extended position. As in the previous embodiment, and as best shown in FIG. 14, when control arms control arms 304 and 306 are collapsed with the shock absorber 324 in a stroked position, the left ski 218L is lifted up relative to right ski 218R. It also moves rearwardly, as in the previous embodiment, having the advantages as previously enumerated. In addition ski 218L is rotated slightly in the clockwise direction, as viewed in FIG. 14.

In the second embodiment, the independent movement of the skis relative to each other has its advantages. First, as there are two skis 218, the skis may provide a wider base than a single ski providing better stability and steering capability. Second, as the skis 218 may move relative to each other, one of the skis (for example left ski 218L in FIGS. 16-17) may be lifted to pass over an object 400, which provides greater stability to the snow bike as the right ski 218R maintains contact with the ground. This provides the ability for one of the skis to be lifted up and over the object without losing control of the snow bike or without a large jolt to the front end of the snow bike. Third, and with reference to FIG. 18, when the snow bike is traversing a side slope, the skis can track with the slope to provide two levels of ski contact with the slope for better stability. Finally, due to the four bar linkage design the amount of ski trail may be adjusted versus the suspension ravel, where ski trail equals the length of the skag or the runner is behind the ski pivot bolt. Thus the ski trail can be adjusted throughout the stroke of the suspension and that can all be dependent of the four bar linkage.

In another embodiment, the two shocks can be adjusted to act differently from each other. For example, a crossover tube 420 (FIG. 12) between the shocks causes the skis to actuate oppositely. That is, when one shock is stroked, it pushes the other down, as the dampening medium is pushed from the stroked shock to the extending shock. This also helps in steering. The crossover tube 420 connects the air flow shocks such that when you lean left, the inside ski lifts up easier and then applies pressure to the outside ski because it's equalizing pressure between the two shocks so it's less rising rate on the inside ski and more of a rising rate on the outside ski which helps it maneuver the corner better than if the two shocks weren't connected between each other.

In another embodiment, a connecting rod or sway bar could be coupled between the skis to couple the two shock absorbers together.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A snow vehicle comprising:
a frame;
a propulsion unit coupled to the frame;
at least one front ski;
a steering mechanism coupled to the frame;
a first front suspension coupled to the frame;
a second front suspension positioned intermediate the first front suspension and the at least one front ski wherein the second front suspension comprises a spindle body, a knuckle coupled to the ski, two front control arms coupled between the knuckle and the spindle body, and a linear force element coupled between the knuckle and the spindle;
a rear suspension coupled to the frame, the rear suspension comprising:
at least one slide rail;
at least one rear control arm coupled between the slide rail and the frame;
at least one linear force element coupled between the slide rail and the frame; and
at least one carrier roller coupled to the at least one slide rail; and
a drive system comprising a drive track slidably guided by the at least one slide rail and drivably coupled to the propulsion unit.

2. The snow vehicle of claim 1, wherein the frame is comprised of a front frame portion and a rear frame portion.

3. The snow vehicle of claim 2, wherein the front frame portion is a motorcycle frame and the rear frame portion is coupled to the motorcycle frame and the rear suspension is coupled to the rear frame portion.

4. The snow vehicle of claim 3, wherein the first front suspension is a linear force element on a front fork of the motorcycle frame.

5. The snow vehicle of claim 4, wherein the second front suspension is coupled to an end of the front fork of the motorcycle frame.

6. The snow vehicle of claim 2, wherein the front frame portion is a bulkhead and the rear frame portion is a tunnel and the rear suspension is coupled to the tunnel.

7. The snow vehicle of claim 6, wherein the first front suspension comprises right upper and lower control arms, left upper and lower control arms and right and left linear force elements coupled between the bulkhead and one of the right and left upper and lower control arms.

8. The snow vehicle of claim 7, wherein the second front suspension comprises the knuckle coupled to the ski, and a linear force element coupled between the knuckle and the spindle.

9. The snow vehicle of claim 8, wherein the two control arms extend from the spindle in a generally rearward direction, and wherein the two control arms upon collapse, move the ski rearwardly and upwardly.

10. The snow vehicle of claim 1, wherein the knuckle is coupled to one of the front control arms.

11. The snow vehicle of claim 1, wherein the two front control arms extend from the spindle in a generally rearward direction, and wherein the two control arms upon collapse, move the front ski rearwardly and upwardly.

12. The snow vehicle of claim 1, wherein the steering mechanism is coupled to the first front suspension.

13. The snow vehicle of claim 12, wherein the first front suspension is a linear force element.

14. The snow vehicle of claim 1, wherein the steering mechanism is coupled to the second front suspension.

15. The snow vehicle of claim 14, wherein the second front suspension comprises a trailing arm suspension.

16. A snow vehicle comprising:
a frame;
a propulsion unit coupled to the frame;
at least two front skis;
a steering mechanism coupled to the frame;
a first front suspension coupled to the frame;
a second front suspension positioned intermediate the first front suspension and the at least two skis, wherein the second front suspension comprises a spindle body and at least two front control arms, with each front control arm coupling a front ski to the spindle body, and with each front ski being independently movable relative to the other front ski;
a rear suspension coupled to the frame, the rear suspension comprising:
at least one slide rail;
at least one rear control arm coupled between the slide rail and the frame;
at least one linear force element coupled between the slide rail and the frame; and
at least one carrier roller coupled to the at least one slide rail; and
a drive system comprising a drive track slidably guided by the at least one slide rail and drivably coupled to the propulsion unit.

17. The snow vehicle of claim 16, further comprising a linear force element coupled between each of the at least two front control arms and the spindle.

18. The snow vehicle of claim 16, wherein the at least one front control arm includes two front control arms per ski, a forward control arm and a rearward control arm.

19. The snow vehicle of claim 18, wherein the forward and rearward control arms for each front ski are coupled to a knuckle, where the knuckle is coupled to the front ski.

20. The snow vehicle of claim 19, wherein a lower end of the linear force element is coupled to the rearward control arm.

21. A front suspension for a snow vehicle comprising:
a spindle body;
a knuckle for coupling to a ski of the snow vehicle; and
at least one control arm coupled intermediate the spindle body and the knuckle;
wherein the at least one control arm extend from the spindle body in a generally rearward direction, and wherein the at least one control arm upon collapse, moves the ski rearwardly and upwardly.

22. The front suspension for a snow vehicle according to claim 21, wherein the at least one control arm comprises two control arms coupled between the knuckle and the spindle body.

23. The front suspension for a snow vehicle according to claim 21, wherein a linear force element is coupled between the knuckle and the spindle body.

24. The snow vehicle of claim 21, wherein the front suspension comprises at least two control arms for coupling two skis, with each control arm coupling a ski to the spindle body.

25. The snow vehicle of claim 24, wherein the front suspension comprises at least two control arms per ski, with two control arms coupling each ski to the spindle body.

26. The snow vehicle of claim 24, wherein the front suspension comprises a knuckle coupled to each ski, and a linear force element coupled between the knuckle and the spindle body.

27. The snow vehicle of claim 26, wherein the linear force element is coupled to one of the control arms on each ski.

28. The snow vehicle of claim 21, wherein the spindle body includes at least two control arms, a forward control arm and a rearward control arm, and the at least one ski comprises two skis, with each control arm coupling a ski to the spindle body, and with each ski being independently movable relative to the other ski.

29. The snow vehicle of claim 28, further comprising a linear force element coupled between the rearward control arm and the spindle.

30. The snow vehicle of claim 29, wherein a lower end of the linear force element is coupled to the rearward control arm.

31. The snow vehicle of claim 28, wherein the spindle body includes two control arms per ski, a forward control arm and a rearward control arm.

32. The snow vehicle of claim 31, wherein the front and rear control arms for each ski are coupled to the knuckle, where the knuckle is coupled to the ski.

33. A front suspension for a snow vehicle having two front skis, comprising:
a spindle body;
at least two control arms coupled to the spindle body; and
a linear force element coupled between each control arm and the spindle body, whereby each control arm is attachable to one of the skis, and each control arm is movable independently of the other.

34. The front suspension for a snow vehicle according to claim 33, wherein the at least two control arms comprises two control arms for coupling to each ski.

35. The front suspension for a snow vehicle according to claim 34, wherein the two control arms are each connected to a knuckle, and each knuckle for coupling to one of the two skis.

36. The front suspension for a snow vehicle according to claim 35, wherein a linear force element is coupled between each knuckle and the spindle.

37. The front suspension for a snow vehicle according to claim 33, wherein the at least two control arms extend from the spindle in a generally rearward direction, and wherein the two control arms upon collapse, move the ski rearwardly and upwardly.

38. The snow vehicle of claim 33, wherein the spindle body includes two control arms per ski, a forward control arm and a rearward control arm.

39. The snow vehicle of claim 38, wherein the forward and rearward control arms for each ski are coupled to a knuckle, where the knuckle is coupled to the ski.

40. The snow vehicle of claim 39, wherein a lower end of the linear force element is coupled to the rear control arm.

41. The snow vehicle of claim 33, wherein the linear force elements are shocks.

42. The snow vehicle of claim 41, further comprising a crossover tube coupled between the shocks, whereby the skis actuate oppositely.

\* \* \* \* \*